(12) United States Patent
Soliman

(10) Patent No.: US 7,457,411 B2
(45) Date of Patent: Nov. 25, 2008

(54) INFORMATION SECURITY VIA DYNAMIC ENCRYPTION WITH HASH FUNCTION

(75) Inventor: Hamdy Soliman, Socorro, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 1122 days.

(21) Appl. No.: 10/735,445

(22) Filed: Dec. 12, 2003

(65) Prior Publication Data

US 2004/0184605 A1    Sep. 23, 2004

Related U.S. Application Data

(63) Continuation-in-part of application No. 10/633,918, filed on Aug. 4, 2003, and a continuation-in-part of application No. 10/448,989, filed on May 30, 2003, now Pat. No. 7,233,644, and a continuation-in-part of application No. 10/387,711, filed on Mar. 13, 2003.

(51) Int. Cl.
*H04L 9/00*    (2006.01)
(52) U.S. Cl. .......................... 380/44; 380/47
(58) Field of Classification Search ............. 380/44, 380/270, 274, 277; 713/153, 168, 169, 170, 713/171, 182; 726/2, 3
See application file for complete search history.

(56) References Cited

U.S. PATENT DOCUMENTS

| | | | | |
|---|---|---|---|---|
| 4,642,793 | A * | 2/1987 | Meaden ................. | 711/216 |
| 5,199,073 | A * | 3/1993 | Scott .................. | 713/190 |
| 6,049,612 | A * | 4/2000 | Fielder et al. .......... | 380/44 |
| 6,687,375 | B1 * | 2/2004 | Matyas et al. .......... | 380/45 |
| 7,219,211 | B1 * | 5/2007 | Greene et al. .......... | 711/216 |
| 2003/0219121 | A1 * | 11/2003 | van Someren .......... | 380/44 |

* cited by examiner

*Primary Examiner*—Benjamin E. Lanier
*Assistant Examiner*—Abdulhakim Nobahar
(74) *Attorney, Agent, or Firm*—Robert W. Becker; Robert W. Becker & Assoc.

(57) ABSTRACT

A system and method providing secure information. An encryption key is regenerated by performing byte addition of an encryption key, encrypted data, and a hash vector based upon an encryption key. A hash vector is hashed by scanning indexed bytes of an encryption key and using indices and associated values of indices of an encryption key as indices of two bytes in the hash vector to be swapped. An authentication key is regenerated by performing byte addition of an authentication key, an auxiliary key, and a hash vector based upon an authentication key.

13 Claims, 19 Drawing Sheets

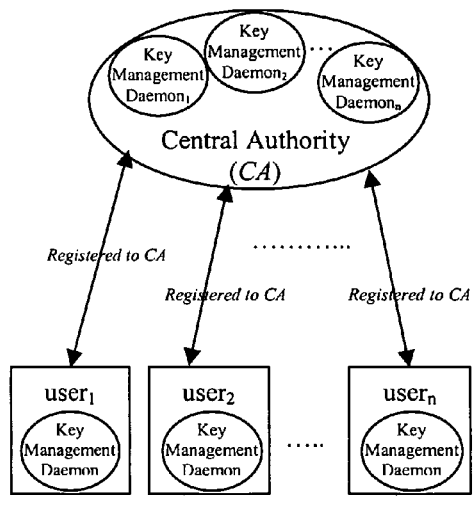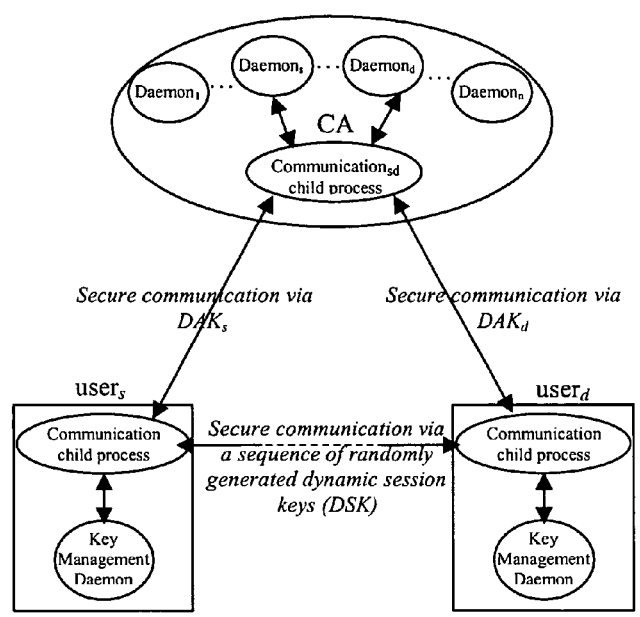
*FIG. 1a*                    *FIG. 1b*

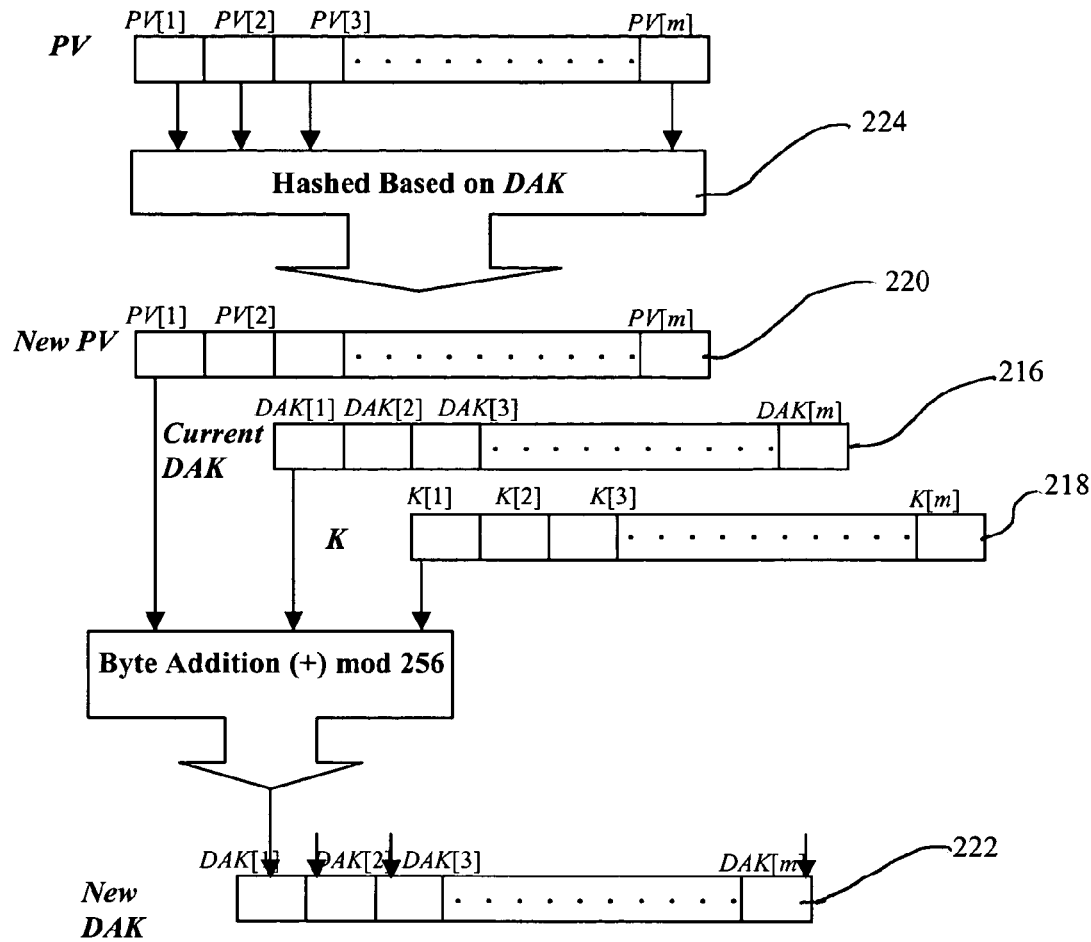
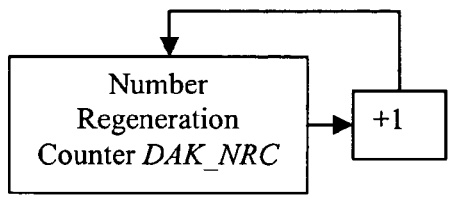
FIG. 4

INFORMATION SECURITY VIA DYNAMIC ENCRYPTION WITH HASH FUNCTION

CROSS-REFERENCE TO RELATED APPLICATIONS

This application is a continuation-in-part of U.S. patent application Ser. No. 10/387,711, entitled "Computer System Security via Dynamic Encryption," filed on Mar. 13, 2003, and claims the benefit of the filing date thereof. This application is a continuation-in-part of U.S. patent application Ser. No. 10/448,989, entitled "Dynamic Security Authentication for Wireless Communication Networks," filed on May 30, 2003 now U.S. Pat. No. 7,233,664, and claims the benefit of the filing date thereof. This application is a continuation-in-part of U.S. patent application Ser. No. 10/633,918, entitled "Computer System Security Via Dynamic Encryption," filed on Aug. 4, 2003, and claims the benefit of the filing date thereof. The entire specifications of all priority applications are incorporated herein by reference.

BACKGROUND

1. Field of the Invention

The present invention relates to the field of information security, more particularly to a dynamic data encryption and node authentication method and system that distributes the complexity of the encryption algorithm over the dynamics of data exchange and involves full synchronization of encryption key regeneration at system nodes, independent of the node clocks.

2. Background

The fundamental objective of cryptography is to enable users to communicate securely and efficiently via an insecure shared data communication channel or system environment, maintaining data integrity, privacy, and user authentication. Over the past century, various cryptography systems have been developed which require a great deal of time to break even with large computational power. However, if an intruder obtains the encryption key, the encryption mechanism is compromised and a new key is required.

In order to make an encryption system nearly impenetrable to an intruder, two strategies are commonly used: 1) a long encryption key, and/or 2) a complex encryption function. A key of length n bits has a $2^n$ search space. Therefore, for large values of n an intruder needs to spend more than a lifetime to break the cipher. Also, simpler encryption functions provide a less secure encryption system. For instance, an encryption code that applies the logic XOR function is easy to decipher no matter how long the key length is. This is because the XOR operation is performed on one bit of data and its corresponding bit from the encryption key, one bit at a time. The deciphering approach of such simple encryption functions by an intruder is based on the divide-and-conquer mechanism. The intruder first deciphers individual key fragments, which is relatively uncomplicated to accomplish due to the simple linearity of the XOR function, then reconstructs the entire key once all of the individual fragments are obtained. It is more difficult to apply such a divide-and-conquer approach to break the key of a nonlinear exponential encryption function, such as used in the Rivest-Shamir-Adelman (RSA) system.

At present, there are two major cryptography system philosophies: 1) symmetric systems (static or semi-dynamic key), and 2) public key systems (static key). In symmetric systems, e.g., DES, AES, etc., a key is exchanged between the users, the sender and receiver, and is used to encrypt and decrypt the data. There are three major problems with symmetric systems. First, exchanging the key between users introduces a security loophole. In order to alleviate such a problem, the exchanged key is encrypted via a secure public key cryptography system. Second, the use of only one static encryption key makes it easier for an intruder to have an ample amount of time to break the key. This issue is addressed by the use of multiple session keys that are exchanged periodically. Third, and more importantly is the susceptibility to an "insider" attack on the key. This is referred to as the "super user" spying on the "setting duck" static key inside the system, where the time window between exchanging keys might be long enough for a super user, who has a super user privilege, to break in and steal the key.

In the RSA public key cryptography system, a user (U) generates two related keys, one is revealed to the public, deemed the "public" key, to be used to encrypt any data to be sent to U. The second key is private to U, called the "private" key, and is used to decrypt any data received at U, which was encrypted with the corresponding public key. The RSA cryptography system generates large random primes and multiplies them to obtain the public key. It also uses a complex encryption function such as mod and exponential operations. As a result, this technique is unbreakable in the lifetime of a human being for large keys, e.g., higher than 256 bits, and also eliminates the problem of the insecure exchange of symmetric keys, as in a DES system. However, the huge computational time required by RSA encryption and decryption, in addition to the time required to generate the keys, is not appealing to the Internet user community. Thus, RSA cryptography is mainly used as "one shot" solid protection of the symmetric cryptography key exchange.

In the RSA public key system, if a first user ($U_A$) requests a secure communication with a second user ($U_B$), the latter will generate a pair of encryption keys: public $E_B$ and private $D_B$. An internal super user spy (S), with a helper (H) intruding on the communication line externally, can easily generate its own pair of keys, a public $E_S$ and private $D_S$, and pass $D_S$ and $E_B$ to H. Then S can replace the public key $E_B$ with its own public key $E_S$. Thus, all data moving from $U_A$ to $U_B$ will be encrypted using $E_S$ instead of $E_B$. Now H can decrypt the cipher text moving between $U_A$ and $U_B$ using the private key $D_S$, store it, and re-encrypt it using the original $E_B$, in order for $U_B$ to receive and decrypt it without any knowledge of the break that occurred in the middle. Such an attack is typically called the "super-user-in-the-middle" attack.

Even though they are secure against outsider attack, both the symmetric and public key cryptography systems are still vulnerable to insider attacks. By obtaining the key at any time of a secure session, an intruder can decipher the entire exchanged data set, past and future. Further, a super user can easily steal a static symmetric key and send it to an outside intruder to sniff and decrypt the cipher text, particularly in the DES and AES systems.

A common way to protect a static encryption key is to save it under a file with restricted access. This restriction is inadequate, however, to prevent a person with a super-user privilege from accessing the static key in the host file. Even when keys are changed for each communication session, for example in the Diffie-Hufman system, an adequate time window exists for the super-user to obtain the semi-static key. In most crypto systems, once the key is found the previous and future communicated data are no longer secure.

Various other attempts have been made to circumvent intrusion by outside users through encryption of communicated data. Examples of such methods include that described in U.S. Pat. No. 6,105,133 to Fielder, et al., entitled, "Bilateral Authentication and Encryption System;" U.S. Pat. No. 6,049, 612 also to Fielder, et al., entitled, "File Encryption Method and System;" and U.S. Pat. No. 6,070,198 to Krause, et al., entitled, "Encryption with a Streams-Based Protocol Stack." While the techniques described in these patents may be useful in preventing unwanted intrusion by outsiders, they are still prone to attack by the super-user-in-the-middle.

The present method and system for information security alleviates the problems encountered in the prior art, providing continuous encryption key modification. A new key is generated from a previous key as well as from a previously encrypted data record. The regenerated key is then used to encrypt the subsequent data record. The key lifetime is equal to the time span of record encryption, reducing the possibility that an intruder will break the key or that a super-user will copy the key. The method and system for information security also alleviates the super-user-in-the-middle attack. An intruder must obtain an entire set of keys, at the right moment, without being noticed, in order to decrypt the entire ciphered message.

The method and system for information security reduces computational overhead by breaking the complexity of the encryption function and shifting it over the dynamics of data exchange. A shuffling mechanism based on a dynamic permutation table, which is generated from the current session key, coupled with one or more logic or arithmetic operations, strengthens the encryption function. Encryption is fully automated and all parties, the source user, destination user, and central authority, are clock-free synchronized, and securely authenticated at all times. The method and system for information security is deployable at any level of a system, as there is complete synchronization between system nodes.

The method and system for information security further eliminates the possibility of an intruder obtaining additional keys, and therefore additional data, in the rare circumstance where an intruder is able to break one of the keys. A previously encrypted data record is combined with a previous key to create a new key for encrypting a subsequent data record. Hence, if an intruder were to break one key, the intruder could only decrypt its corresponding data record and nothing more, past or future ciphered data.

SUMMARY

The present invention is a system and a method of providing secure information. Encryption keys are regenerated with an encryption key, encrypted data, and a hash vector based upon an encryption key.

BRIEF DESCRIPTION OF THE DRAWINGS

The accompanying drawings, which are incorporated into and form a part of the specification, illustrate the method and system for information security and, together with the description, serve to explain the principles of the invention. The drawings are not to be construed as limiting the method and system.

FIG. 1a is a diagrammatic overview of a central authority (CA) generating daemons to manage users' dynamic authentication keys (DAKs);

FIG. 1b is a diagrammatic overview of secure communication between users;

FIG. 4 is a diagrammatic illustration of a DAK regeneration method;

DESCRIPTION OF THE PREFERRED EMBODIMENTS

Figure 2:
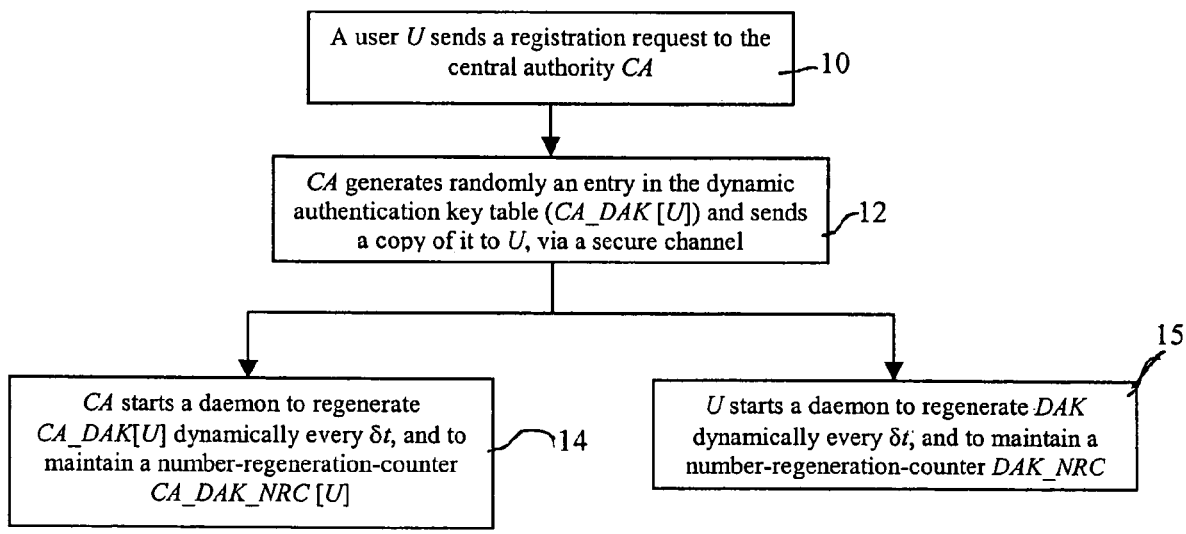
FIG. 2 is a diagrammatic illustration of a user registration request to a CA.

The method and system for information security provides dynamic symmetric key encryption for network security. The method and system is implemented between end-user (U) sites, or "nodes", and central authentication authority (CA) sites, or "nodes", for user authentication purposes, and between end-user nodes for secure exchange of data. The users and CA reside at their respective nodes, which can be but are not limited to programmable apparatuses or communication devices, such as computers, telephones, mobile communication devices, handheld communication devices and the like. The users and CA are in communication, for example via a computer or telecommunication network. Communicated data flows over a data stream between the user and CA nodes. The data stream flows over transmission means, which can include but is not limited to electrical signals carried by electrically conductive wires, radio signals, and infrared signals. Computer-readable memory provides storage for the data, dynamically changing keys, and other variables, as needed to allow for the regeneration of subsequent dynamic keys, and to carry out other necessary processes. Means are provided on or in communication with the programmable apparatuses or communication devices for performing all of the various methods involved in the dynamic encryption method, including regenerating keys and encrypting data. Such means include primarily computer-readable means, such as software, and the necessary related hardware.

The encryption method and system for information security distributes the complexity of the encryption algorithm over the dynamics of data exchange, involving previously encrypted data as well as a previous key in the process of regenerating a new "dynamic" encryption key. Thus, there is a newly generated key for the encryption of every data record, yielding very low correlation between the cipher, or encrypted data, and the plain data. There are no static keys, public or private, that are susceptible to a security breach. In order to guarantee security, the encryption method is preferably deployed in a system of registered end-users with a CA, whereby the CA maintains user connections' authentication and secures distribution of symmetric encryption session keys.

The method and system for information security employs two types of dynamic keys, namely dynamic authentication keys (DAKs) and dynamic session keys (DSKs). The former is used to mutually authenticate users and CAs; it is continuously regenerated throughout the existence of the user and the CA. The latter exists when the need arises for a secure data exchange session between users; its regeneration is maintained only through the life cycle of such a session. The placement of the initial DSK at users' nodes is securely carried out by the CA, and encrypted using the users' DAKs. The CA maintains an array of DAKs, one per user.

In order to maintain high level of security, only a hash vector, which is based on the key (Hash_DAK_Vec or Hash_DSK_Vec), is deployed directly in the encryption process. One implementation of the hash vector considers a permutation vector (PV) of m bytes, set initially to be (1, 2, ..., m). Then each time a new dynamic key is regenerated, the PV is hashed based on that dynamic key, DAK or DSK.

The method and system for information security further employs an auxiliary static key K, which is formed based on the DSK and the DAK, given that the user has established a session; otherwise, it is formed from the initial DAK only. This static key is continuously involved in the regeneration of the DAK. The auxiliary static key adds another dimension of security to the process against insider attacks, as it involves more dynamics to the regeneration of the DAK by allowing the contribution of the DSK to the process, every new communication session between users. The static nature of K is not exploited by the attacker because its exploitation does not lead to any important information; its relation to the DSK and the DAK is not reversible, i.e., K is manufactured from DSK and DAK, yet neither DSK nor DAK can be obtained from K.

The major role of the CA is to maintain the registered users' DAK generation and the secure delivery of symmetric DSKs between the users. The CA also authenticates the source user to the destination user and vice versa, while authenticating itself to both users. Unless a user is pre-registered with the CA, it is nearly impossible for an intruder to have the same synchronized dynamic key with the CA, as a registered user. The only explicit user identity verification is carried out once, at the time the user first registers with the CA. Any consequent authentication is implicitly processed, without the need to exchange any plain keys, which would require a secure channel. The authentication method involves the three parties to any connection: source user, destination user, and CA, authenticating each other via their corresponding synchronized dynamic key.

Referring to FIG. 1a, a diagrammatic overview of a CA generating daemons to manage users' DAKs in accordance with the method and system for information security is shown. Registration of trusted users, users that have for example, provided a valid certificate of authentication or who are referred by a previously-registered third party user, occurs over a secure channel, for example, using RSA encryption, where the CA provides the user with an initial DAK.

Referring to FIG. 1b, a diagrammatic overview of user communication encrypted with a DSK initially generated and sent by a CA is shown. Upon any user's connection request, a communication child process is forked at the CA, as well as at the user node. Each child process runs on the behalf of its parent during the whole communication session in order to avoid disturbance of the DAK generation process in the event of synchronization or authentication failure, for example, due to a false connection request, hardware failure, etc.

The CA is responsible for secure user authentication and generation of the initial trusted user dynamic authentication key, DAK. Every user must register with the CA in order to obtain its initial DAK, which is exchanged via a secure channel, e.g., using RSA. Upon the initiation of any new user's secure data exchange session, both end-users and the CA freeze their DAK generation and synchronize by establishing the same dynamic change. After the user and the CA are synchronized (their DAKs are aligned), they both yield the same randomly generated DAK at both nodes. This DAK is used in the authentication method as the encryption and decryption key, because it is maintained only by the CA and the user.

Referring to FIG. 2, a diagram further illustrates the user registration method with a CA. The user starts the registration process by sending a request 10, effectively requesting the generation of an initial value of its DAK, to the CA including authenticated documentation of its identity and purpose of registration, i.e. revealing it is a trusted user. Upon approval of the user's credentials by the CA, the CA starts a daemon related to the requesting user, and randomly selects an initial DAK, sending a copy to the user via a secure channel 12, for example, using the well-known RSA technique where the CA uses the user's public key to encrypt the newly generated DAK. Then the CA starts a daemon that permanently regenerates the DAK. Upon the reception of the initial DAK, the user starts a daemon in order to permanently regenerate the DAK. From that point forward, the user and CA randomly regenerate the next DAK every δt period, 14, 15, based on the previous generated DAK and the auxiliary static key K. The user and CA also maintain a number-regeneration-counter (NRC). This method of regenerating new DAKs is depicted in greater detail in FIGS. 3, 4a, and 4b.

Figure 3A:
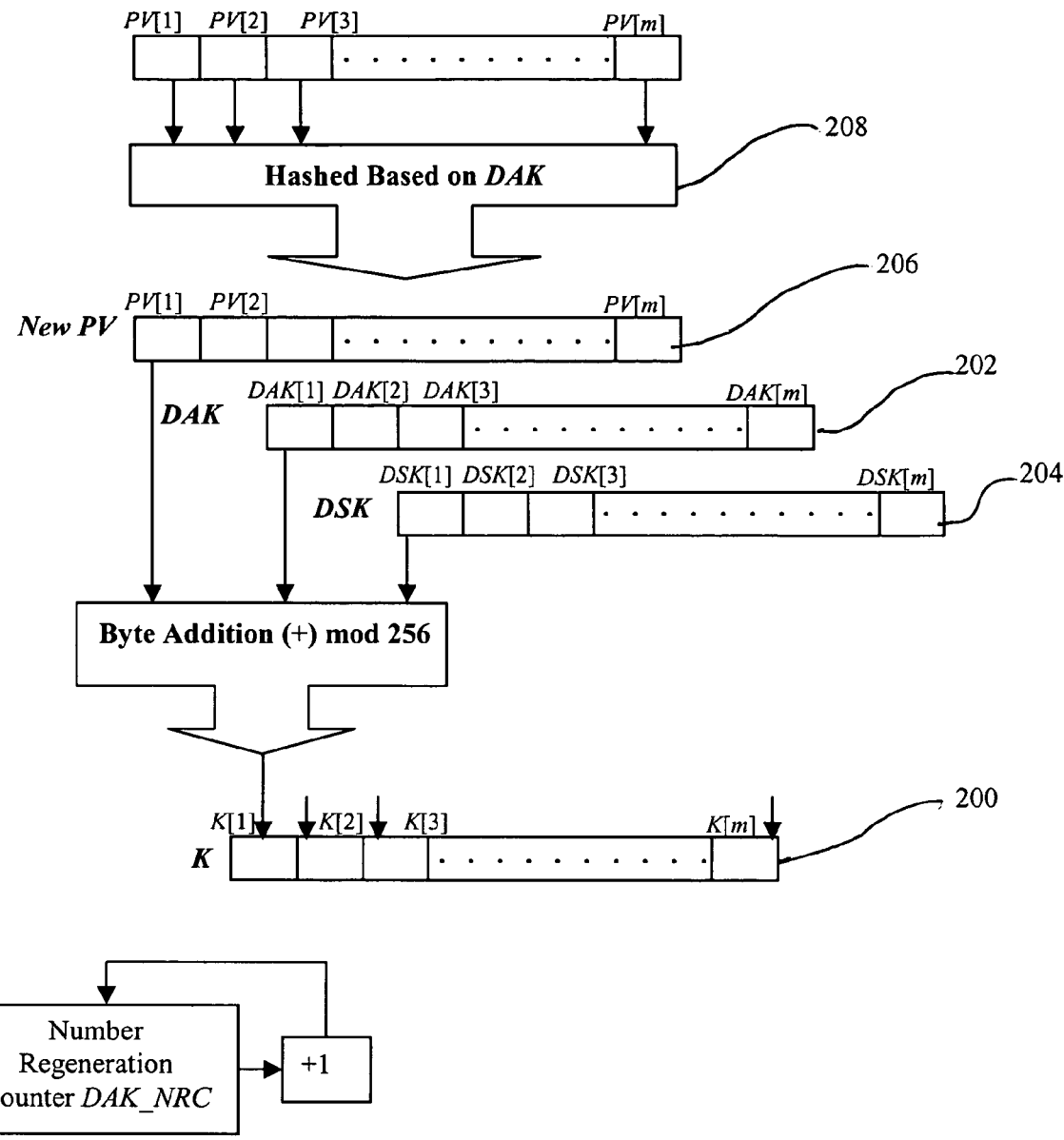
FIG. 3a is a diagrammatic illustration of the formation of an auxiliary static key (K) using a DAK and previous DSK.

FIG. 3a illustrates a method of forming auxiliary static key K 200. K is formed using the CA-user aligned DAK 202, DSK 204, and PV 206, where DAK[j] represents the $j^{th}$ byte of the dynamic authentication key, DSK[j] represents the $j^{th}$ byte of the last dynamic session key, K[j] represents the $j^{th}$ byte of the auxiliary static key K, and PV[j] represents the $j^{th}$ byte of the initial permutation vector (i.e., PV[j]=j), for $1 \leq j \leq m$. Each static key K 200 is created using the CA-user aligned DAK 202 and the last user session DSK 204. The new $j^{th}$ byte of the auxiliary key K 200 is generated as follows:

$$K[j]=(DAK[j]+DSK[j]+PV[j]) \bmod 256.$$

Then, PV is hashed 208 using the DAK in order to be used in encryption and the next DAK regeneration. In the hashing process, DAK bytes are scanned from index 1 to index m, using each entry's index and its associated entry value, as indices of two bytes in the permutation vector to be swapped.

The permutation is performed as follows: permute PV[j] with PV[DAK[j]], for $1 \leq j \leq m$, which results in a "new" permutation vector PV 206. This operation is performed at both the source and destination user nodes. This method is used to form K 200 when a user communication session is taking place and DSKs are being regenerated.

Figure 3B:
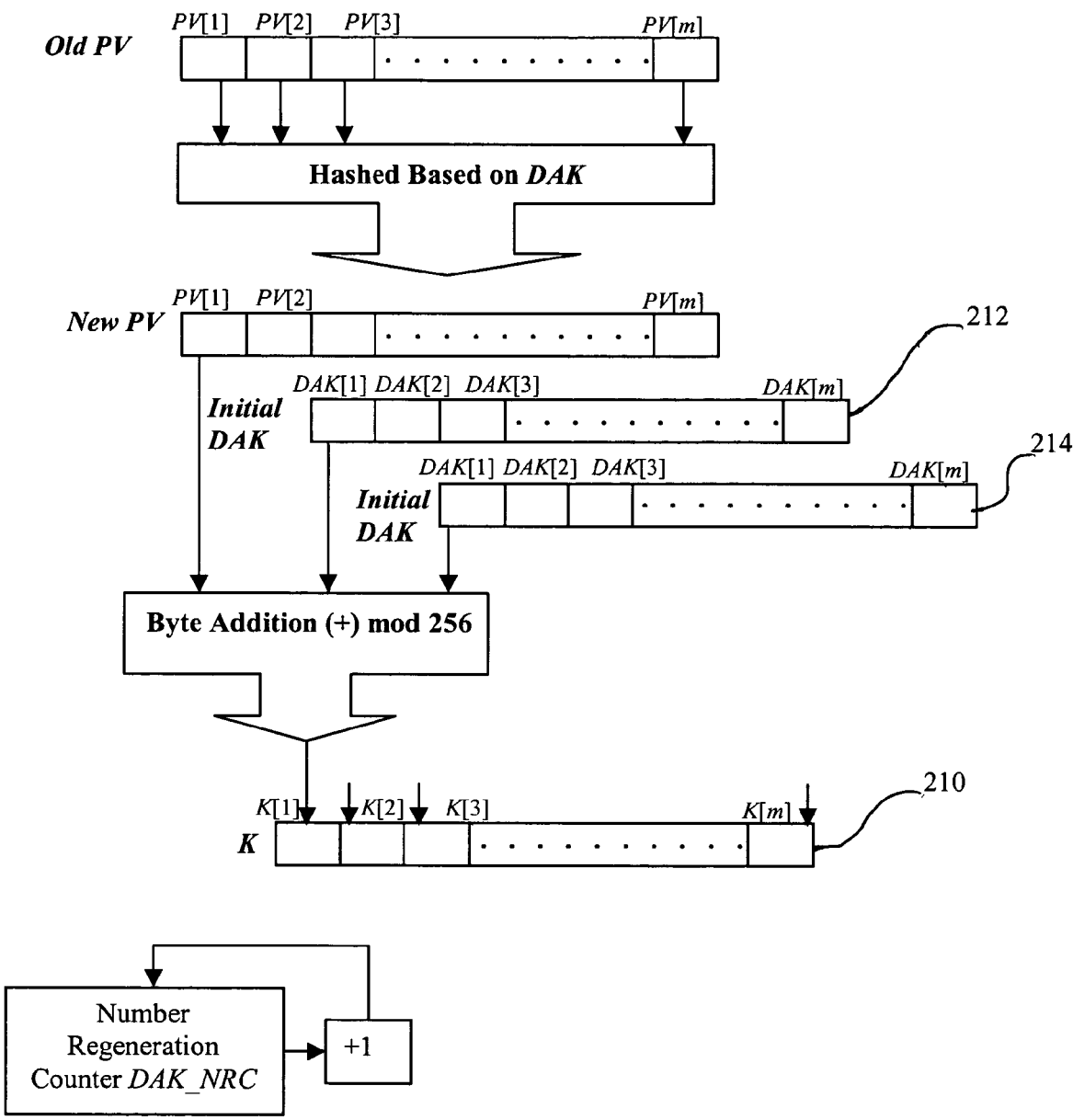
FIG. 3b is a diagrammatic illustration of the formation of an auxiliary static key (K) using an initial DAK.

FIG. 3b illustrates the formation of K, 210 using two copies of an initial CA-user aligned DAK, 212, 214. This method is used to form K 210 when a communication session is not taking place and a user DSK is absent. Thus, the methodology of FIG. 3b follows the same pattern as described with reference to FIG. 3a, except that the non-existing DSK is replaced by another copy of the initial DAK.

Continuing on to FIG. 4, a diagram illustrates continuous DAK regeneration, where DAK[j] 216 represents the $j^{th}$ byte of the dynamic authentication key, K[j] 218 represents the $j^{th}$ byte of the auxiliary static key, generated according to FIG. 3a or 3b, and PV[j] 220 represents the $j^{th}$ byte of the permutation vector (set initially to j, i.e., PV[j]=j, for $1 \leq j \leq m$.

The new $j^{th}$ byte of the DAK 222 is generated as follows:

$$DAK[j]=(DAK[j]+K[j]+PV[j]) \bmod 256.$$

Then, the old PV is hashed 224 using the DAK in order to be used in encryption and the next DAK regeneration. PV is hashed based on DAK, generating hash_DAK_Vec. In the hashing process, the DAK bytes are scanned from index 1 to index m, using each entry's index and associated entry value, as indices of two bytes in the permutation vector to be swapped. The permutation is performed as follows: permute PV[j] with PV[DAK[j]], for $1 \leq j \leq m$, which results in a "new" permutation vector PV 220.

It will be understood by those of skill in the art that alternative logic operations can be substituted for the addition operation in FIGS. 3, 4a, and 4b, as well as in FIGS. 15a, 15b, and 16 described further below.

The operations depicted in FIGS. 3a, 3b, and 4 are performed at both the user and the CA nodes. In order to maintain synchronization control, a number-regeneration-count for the dynamic authentication key (DAK_NRC) is maintained and incremented after each DAK regeneration. This method can be performed periodically or aperiodically with mutual consent of CA and user.

Figure 5:
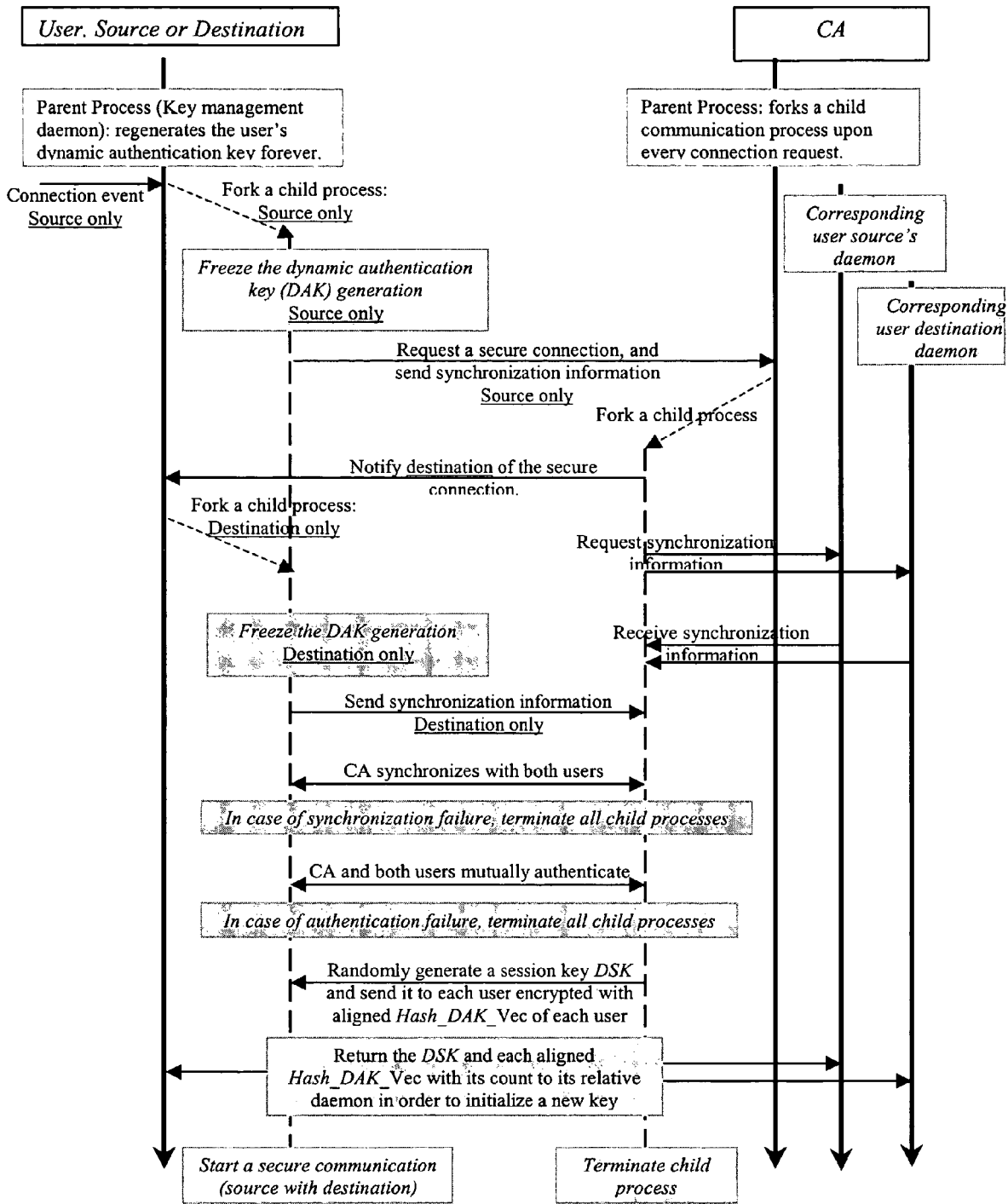
FIG. 5 is a diagrammatic overview of synchronization and authentication between users and a CA, and initial generation of a DSK by a CA.

Turning to FIG. 5, a diagrammatic overview of synchronization and authentication between users and a CA, and initial generation of a DSK by a CA is shown. DAK regeneration starts at both the user and the CA nodes, upon user registration, where each generates the same sequence of random DAKs, with the initial DAK as a seed, even after the user-CA connection is terminated. Thus, key exchange between users, as well as between users and the CA, is minimized to maintain a high level of security. Users and the CA instead remain synchronized at all times with respect to DAK regeneration. When the user-CA connection is terminated after initial request for user registration with the CA, synchronized DAK regeneration continues off-line. Permanent regeneration of the DAK is maintained via a daemon running at each registered user, and a corresponding daemon running at the CA.

With continuing reference to the center portion of the diagram of FIG. 5, in order to establish a connection between a source user $U_s$ and a destination user $U_d$, $U_s$'s DAK regeneration daemon forks a child communication process $U_s\_COM$, which freezes its version of the DAK and its NRC, and sends a connection request to the CA including synchronization information. Upon the reception of such request, the CA's communication server forks a communication child process CA_COM, which will notify $U_d$ of the connection with $U_s$. Upon the acceptance by $U_d$ to the connection, $U_d$'s DAK regeneration daemon forks a child communication process $U_d\_COM$, which freezes its version of the DAK and its NRC, and sends synchronization information back to the CA_COM. Then, the CA_COM snapshots both users' DAKs/NRCs from their corresponding CA's DAK daemons, and starts the synchronization and authentication processes with both users' communication child processes.

Upon successful mutual synchronization and authentication involving the three session parties, the CA_COM generates a random dynamic session key DSK and encrypts it using the aligned Hash_DAK_Vec of each user, and sends it to both users. After receiving the encrypted DSK, each of the two users' child communication process decrypts the DSK using its respective aligned Hash_DAK_Vec, and starts a secure communication session with the other child communication process, via the decrypted DSK.

In the event of failure, the child processes are terminated without interruption to the parent processes and/or daemons. This feature provides protection against a "synchronization disturbance" attack. In such an attack, an intruder imitating a registered user or a CA might force the three DAK number-regeneration-counters (NRCs) to freeze, which will create a chaotic state, but only in the child processes. The counters are continuously counting, i.e., DAKs are continuously regenerated in the daemons without stopping, except when rebooting. The child processes snapshot, or "freeze", the DAK/NRC for use in the synchronization, authentication, and secure DSK exchange. Thus, the continuously running DAK daemons are unaffected in the parent processes in the event of a failure to establish a connection, or in the event of a synchronization disturbance.

However, in the event of successful synchronization and authentication, the child processes at the users' nodes return the aligned DAK and the newly generated DSK to their respective parent daemons in order to initialize a new state for DAK regeneration, forcing the daemon to discard the current value of DAK and DSK (if it exists), and consider the newly returned versions in the DAK regeneration process. Also, the CA_COM return the two aligned DAKs and the newly generated DSK to their respective DAK daemons at the CA in order to initialize a new state for DAK regeneration, forcing both local users' daemons to discard their current DAK and DSK (if it exists) values, and consider the newly returned versions in the DAK regeneration process. Then, the CA_COM terminates successfully, whereas the $U_s\_COM$ and $U_d\_COM$ start a secure communication.

Figure 6:
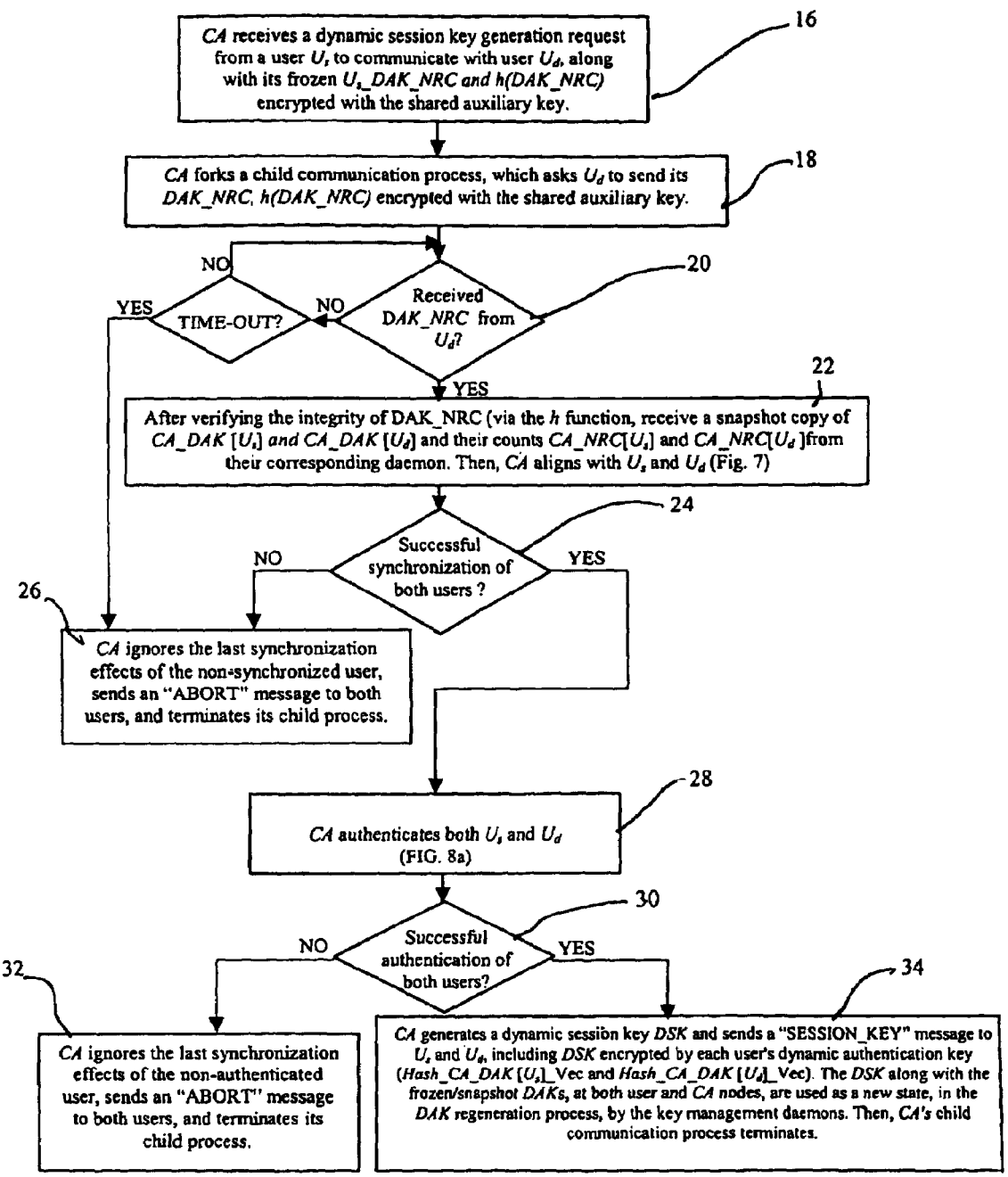
FIG. 6 is a diagrammatic illustration detailing the method of FIG. 5.

Referring to FIG. 6, a diagrammatic overview of synchronization, authentication, and generation of a DSK by a CA in response to a request from a source user ($U_s$) to communicate with a destination user ($U_d$) is provided. (See also FIG. 5.) Source user $U_s$ requests a DSK generation from CA to communicate with destination user $U_d$, and sends its frozen DAK_NRC along with its hashed value h(DAK_NRC), encrypted with the current static key K, namely $E_K$(DAK_NRC, h(DAK_NRC))16. The h function, which could be any known hash function such as MD5 and SHA1, guarantees the integrity of the communicated DAK_NRC. If the received h(DAK_NRC) is different from the calculated hash value of the received DAK_NRC, i.e., h(DAK_NRC), then the communication is aborted due to possible denial-of-service attack. Otherwise, the CA forks a CA_COM, which snapshots the two users DAKs, namely CA_DAK[$U_s$] and CA_DAK[$U_d$], and requests $U_d$ to send its DAK_NRC, 18. This request notifies $U_d$ that $U_s$ is trying to establish a secure communication with it. Once the CA has received the $U_d$ DAK_NRC, 20, the synchronization process is initiated, 22.

Synchronization ensures that the CA has DAK values identical to the users' DAK values, despite message propagation delay. The CA ensures that its locally snapshot DAK for $U_s$ and the corresponding frozen DAK at $U_s$'s node are aligned, and also ensures that its locally snapshot DAK for $U_d$ and the corresponding frozen DAK at $U_d$'s node, are aligned. To compensate for propagation delay and align the corresponding CA's DAK with each of the parties' DAKs, the difference (x) in the number of key regeneration counts, NRCs, between CA and each user, will be considered by the lagging party, which will regenerate its DAK an extra x times (See FIG. 7.)

If alignment is not achieved with both users, 26, CA ignores the synchronization effects from the non-synchronized user(s), sends an abort message to both users before killing its communication child process, and cancels the communication due to lack of synchronization.

Figure 8A:
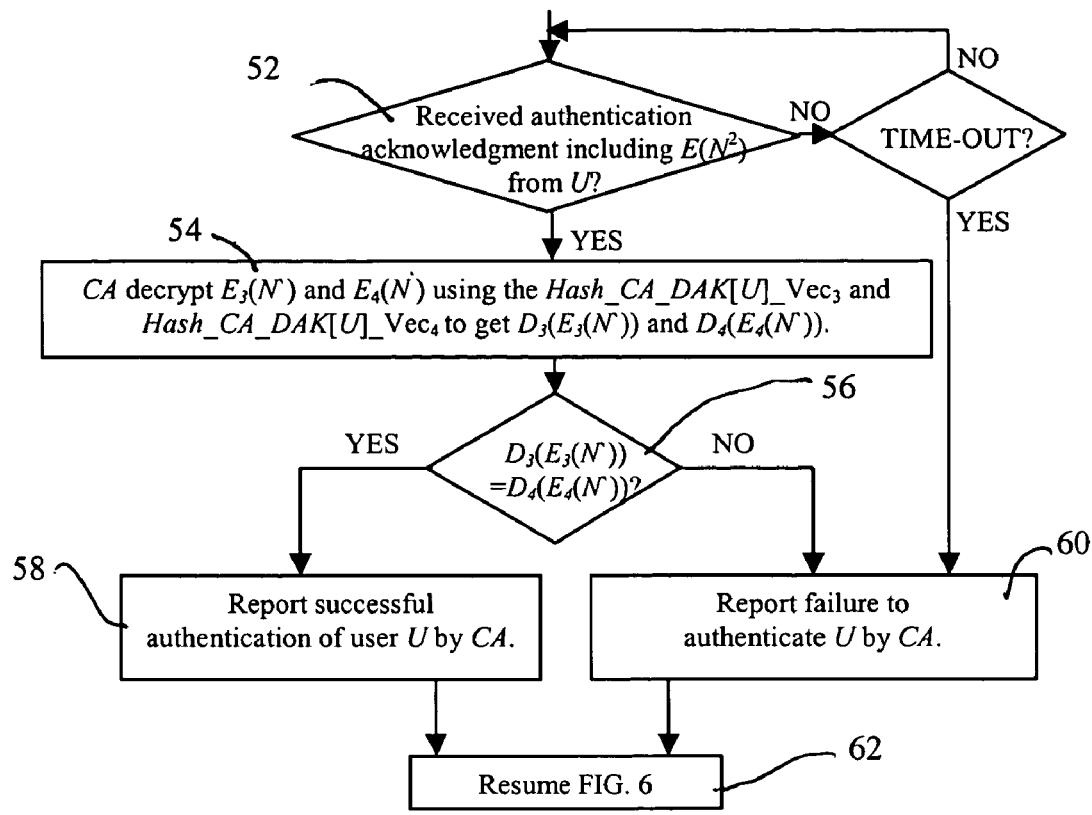
FIG. 8a is a diagrammatic illustration of a method whereby a CA authenticates a user.
Figure 8B:
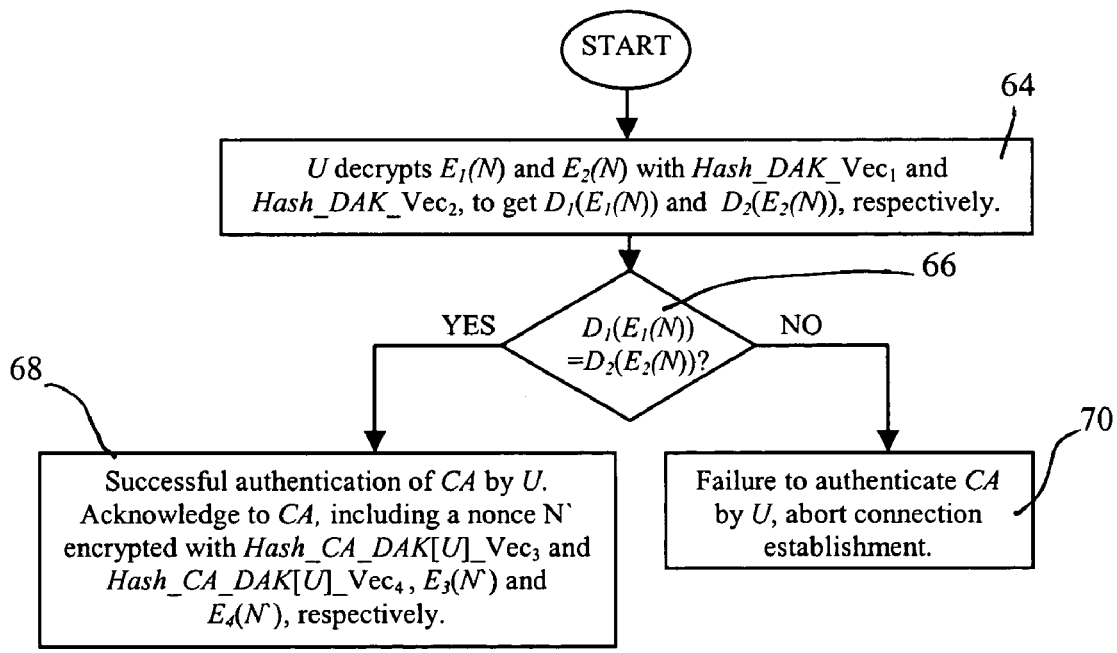
FIG. 8b is a diagrammatic illustration of a method whereby a user authenticates a CA.

In the event of successful synchronization with both users, 24, the CA launches an authentication method, 28, to certify their identity. (FIGS. 8a and 8b.) If successful authentication of both users is not achieved, 32, CA ignores any synchronization effects of the non-authenticated user(s), sends an abort message to both users before killing its communication child process, and cancels the communication due to lack of authentication. If both users are fully authenticated and synchronized with CA, 30, the CA randomly generates an initial DSK and sends it to both users, encrypted with the hash vector of each user's corresponding aligned DAK, to begin data exchange, 134. After the entire process is completed, successful or unsuccessful, the CA_COM terminates and returns its status to the parent process.

Figure 7:
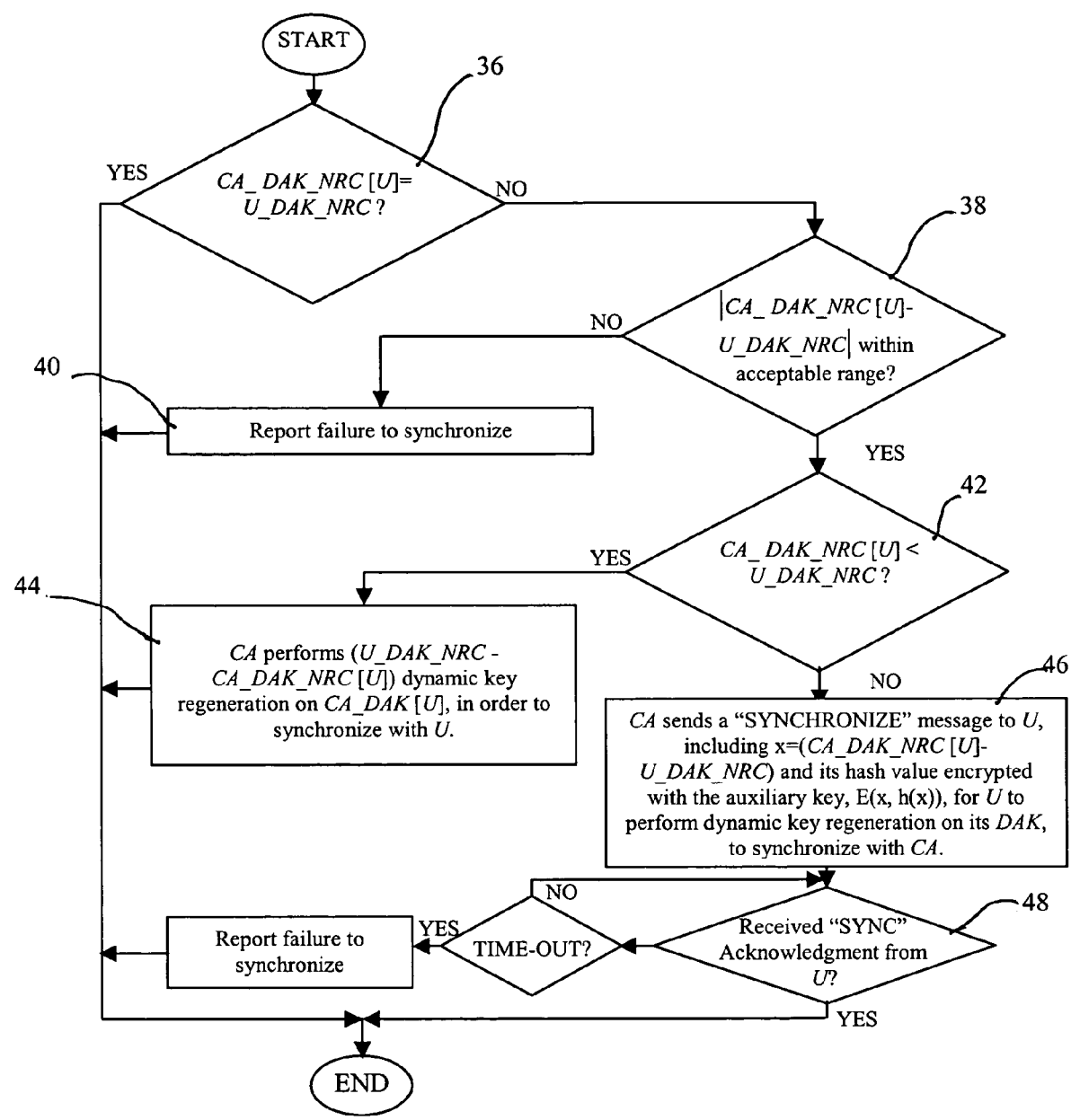
FIG. 7 is a diagrammatic illustration of synchronization of DAKs between a CA and a user.

Referring to FIG. 7, a diagram illustrates synchronization of DAKs between a CA and a user, based on the number-regeneration-count for the DAK at each node. Initially, the number-regeneration-count of the DAK for user (U) at the CA, (CA_DAK_NRC[U]), is compared to the number-regeneration-count of the DAK at the user's node (U_DAK_NRC), 36. If the two NRCs are equal, then the CA and user are synchronized. If the comparison of the NRCs is outside of a predetermined acceptable range, a "failure-to-synchronize" message is reported, 40. This occurs when |CA_DAK_NRC[U]–U_DAK_NRC|, 38, is larger than a predetermined value, and the communication is terminated.

If the comparison of the NRCs is within the predetermined acceptable range, then the lagging party performs a number of DAK regenerations equal to the calculated difference in order to synchronize (i.e., align the DAKs) with the other party. For example, if the CA NRC lags behind that of the user, 42, then the CA performs (U_DAK_NRC–CA_DAK_NRC [U]) regenerations of its DAK in order to align with that of U, 44. If the user NRC lags behind that of the CA, the CA sends a "synchronize" message, 46, including the calculated NRC difference x and its hash value h(x), encrypted with the auxiliary key in the manner depicted at 16 of FIG. 6), so that the user can perform the appropriate number of regenerations to synchronize with the CA. Once the user performs the regenerations, it signifies that it has done so to the CA, 48.

Once the parties are synchronized, mutual authentication of DAKs is performed to ensure the parties indeed share the same DAK. For this purpose, both the user and the CA generate three extra DAKs in addition to the aligned one, namely Hash_CA_DAK[U]_Vec$_{1, 2, 3, 4}$. FIGS. 8a and 8b illustrate the mutual authentication method. FIG. 8a illustrates authentication of a user by a CA, and FIG. 8b illustrates authentication of a CA by a user. The process begins by CA generating a random number, or nonce, N. CA sends $E_1(N)$ and $E_2(N)$ to the user, as part of an "authenticate" message, 50, where $E_1(N)$ and $E_2(N)$ are the encrypted versions of N using the Hash_CA_DAK[U]_Vec$_1$ and Hash_CA_DAK[U]_Vec$_2$, respectively. The user decrypts $E_1(N)$ and $E_2(N)$ using its frozen Hash_DAK_Vec$_1$ and Hash_DAK_Vec$_2$, respectively, 64 and verifies that $D_1(E_1(N))=D_2(E_2(N))$, 66. If they are equal, the user thus authenticates the CA, 68, otherwise, the user failed to authenticate the CA and the connection is aborted, 70.

When the user has successfully authenticated the CA, 68, the user encrypts another nonce N' with its Hash_DAK_Vec$_3$ and Hash_DAK_Vec$_4$, ($E_3(N')$, $E_4 N'$)), and sends the pair back to the CA, as part of the authentication acknowledgment message to complete the authentication process, 68. Upon receiving the authentication acknowledgment back from the user, 52, CA decrypts the received ciphered numbers, again using Hash_CA_DAK [U]_Vec$_3$ and Hash_DAK_Vec$_4$, 54 and compares the two decrypted values, 56. If they are not equal, the CA reports a failure to authenticate the user, 60, and aborts the establishment of a connection, otherwise the user is successfully authenticated by the CA, i.e., has been registered with the CA, 58. The CA performs the same mutual authentication method with the second user before user-to-user communication takes place. When all parties have been mutually authenticated, CA proceeds to DSK generation, 62, the last step of FIG. 6.

Figures 9A, 9B:
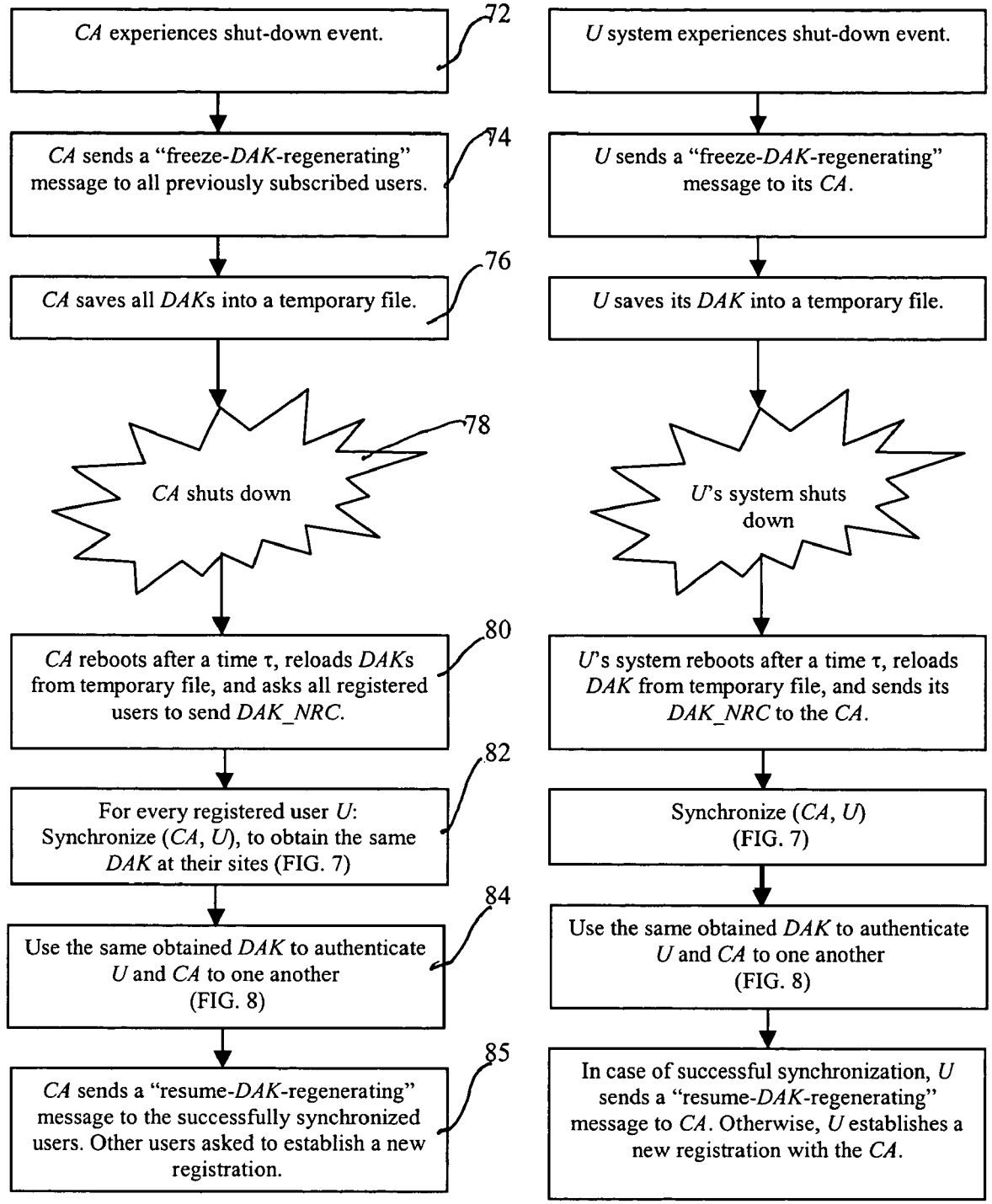
FIG. 9a is a diagrammatic illustration of a method whereby a CA freezes and resumes regeneration of users' DAKs upon occurrence of a CA shutdown event.
FIG. 9b is a diagrammatic illustration of a method whereby a user freezes and resumes regeneration of its DAK upon occurrence of a user shutdown event.

As systems are prone to unpredicted shutdown events, such as but not limited to power loss, the method and system for information security automatically freezes and resumes key regeneration upon occurrence of such events. Referring to FIG. 9a, a diagram illustrating freezing and resuming regeneration of DAKs when a CA experiences a shutdown event, is shown. FIG. 9b illustrates freezing and resuming regeneration of DAKs when a user experiences a shutdown event. Referring to FIG. 9a, a CA is shown to experience a shutdown event, 72. The CA immediately sends a "freeze-DAK-regenerating" message to all previously registered users, 74, as part of its shutdown handler routine. Meanwhile, the CA saves all users' DAKs into a temporary file, 76. After shutting down, 78, for a time period τ, the CA reboots and reloads all the previously saved DAKs. The CA then requests the DAK_NRC from all users to ensure validity of the current DAKs, 80. Then, the CA starts the synchronization process, 82 as described with respect to FIG. 7. The CA then initiates the mutual authentication process with all successfully synchronized users, 84. (FIGS. 8a and 8b.) Finally, the CA sends a "resume-DAK-regenerating" message to its registered and successfully synchronized and authenticated users, in order to resume realigned regeneration of the DAKs, 85. A similar method is performed by the user in the event of a user's system shutdown, as depicted in FIG. 9b.

Figure 10:
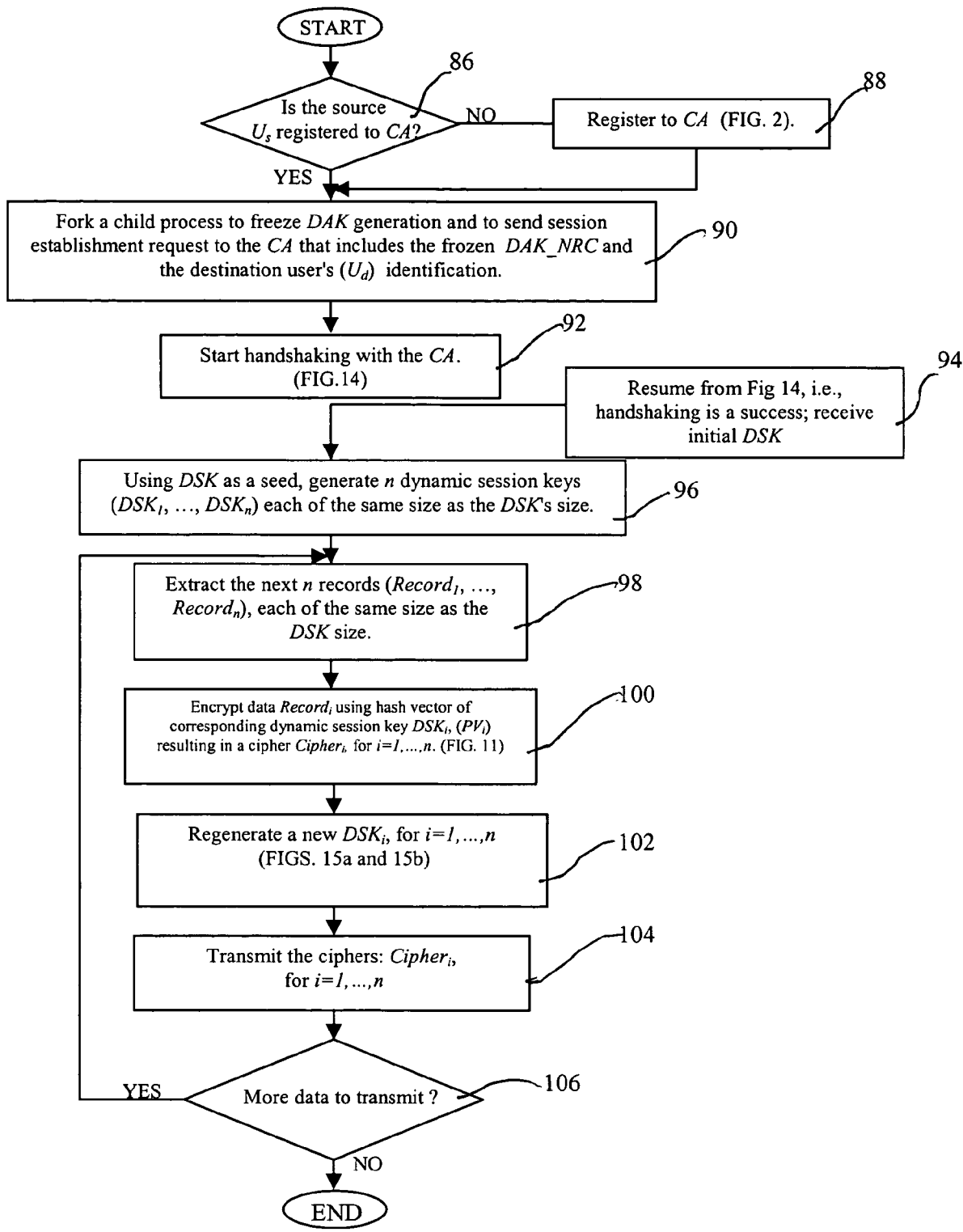
FIG. 10 is a diagrammatic illustration of secure communication establishment at a source user node.

After a user is registered with a CA, the user may request a secure communication with another user. Referring to FIG. 10, a diagram illustrates secure communication establishment at the source user ($U_s$) node. The source user first determines whether it is registered to a CA, 86. If not, the user performs the registration procedure and receives its initial DAK via a common secure channel, 88. (See also FIG. 2.) Then, the source user's DAK daemon forks a child communication process $U_s$_COM, 90, which freezes its DAK generation and runs on behalf of the user until the end of the users' session communication. $U_s$_COM requests a secure connection establishment with the destination user ($U_d$) from the CA, and sends its frozen DAK_NRC for synchronization purposes. In the event of successful handshaking with the CA, 92 (see also FIG. 14), the source user receives an initial dynamic session key DSK, from the CA, 94.

The $U_s$-$U_d$ data exchange session uses the shared symmetric DSK sent by the CA to both users. However, to increase the level of dynamic encryption to n crypto parallel streams, a set of n updated DSKs is derived randomly from the initial DSK, used as a seed, sent by CA. The source user message is stepped through n records, or a "block", at a time, and the first n DSKs generated are used to encrypt the first block of n records. After that, n DSKs are regenerated for each consecutive block as a function of previously generated DSKs and previously encrypted data records.

This process is depicted in FIG. 10 after the source user has had successful handshaking, 94. The source user first generates randomly n different DSKs ($DSK^i$, where $1 \le i \le n$), of the same size as the initial DSK, 96. Then, n data records of the same size as the size of DSK ($Record_i$, where $1 \le i \le n$) are extracted from the input data, 98, and encrypted 100. See also FIG. 11. Next, for every $Record_i$ a new $DSK_i$ is regenerated, 102, which is depicted in greater detail in FIGS. 15a and 15b below on a byte-by-byte basis. Finally, the n ciphered records are transmitted to $U_d$, 104. The encryption method described at 100 of FIG. 10 is illustrated in greater detail in FIG. 11.

Figure 11:
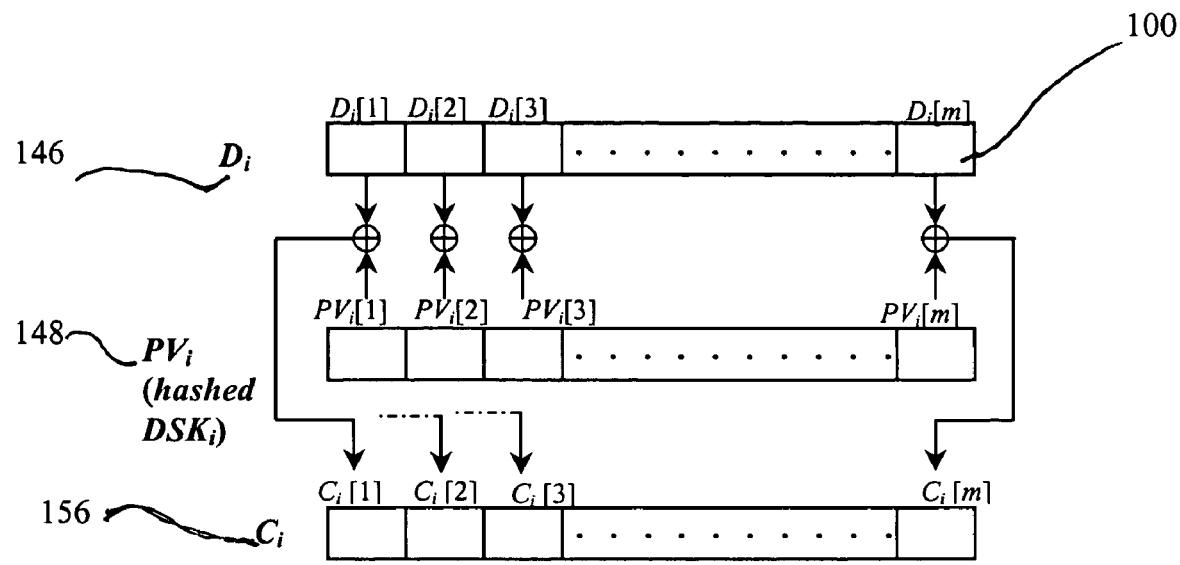
FIG. 11 is a diagrammatic illustration of a dynamic encryption utilizing a permutation vector.

Turning to FIG. 11, a diagram illustrates the encryption method described at 100 of FIG. 10. In FIG. 11, $D_i[j]$ is the $j^{th}$ byte of the $i^{th}$ data record, $C_i[j]$ is the $j^{th}$ byte of the produced $i^{th}$ cipher record, $PV_i[j]$ represents the $j^{th}$ byte of the $i^{th}$ permutation vector (set initially to j, i.e., $PV_i[j]=j$), $1 \le i \le n$ and $1 \le j \le m$, for n records, each of which is of m bytes.

The data record $D_i$ and the $PV_i$ are used to produce cipher record $C_i$, $1 \le i \le n$, producing n cipher records. The encryption method uses a simple XOR logic operation as an encryption function between a $PV_i$ and its corresponding data record $D_i$. The data byte $D_i[j]$, 146, is XORed with the corresponding key byte $PV_i[j]$, 148, which results in the final cipher record $C_i$, 156. After n data records are encrypted with n PVs as aforementioned, the final cipher block, made up of n cipher records ($C_i$, where $1 \le i \le n$), is available for transmission, and a set of n new DSKs and PVs are regenerated for encryption of the next data block, as discussed with reference to FIGS. 15a and 15b.

Returning to FIG. 10, the final cipher block is transmitted to $U_d$, 104 after having generated the n updated DSKs, 102, for encrypting the next data block of n records. The method of data encryption and transmission is repeated, 106, until the entire data volume has been encrypted and transmitted.

Figure 12:
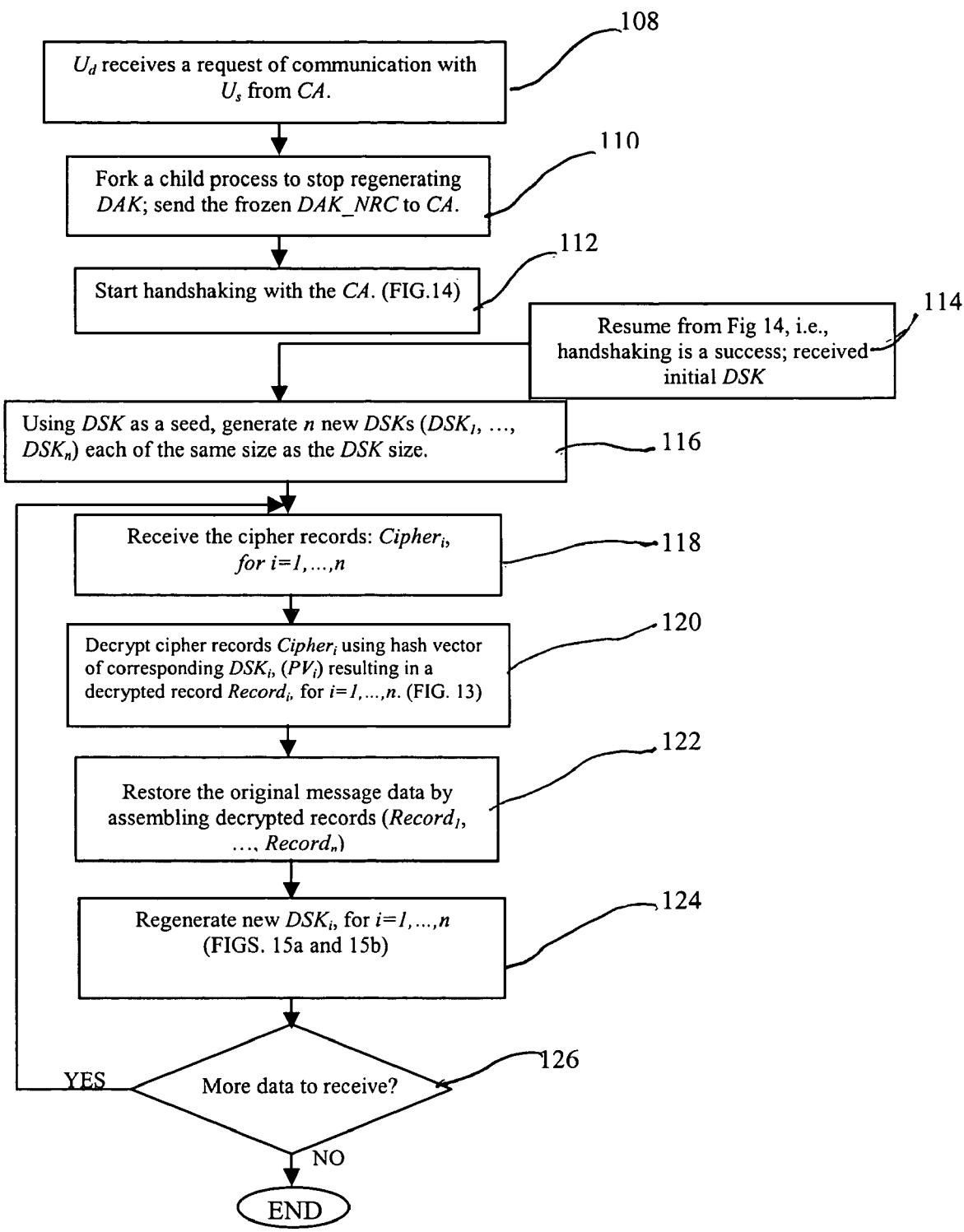
FIG. 12 is a diagrammatic illustration of secure communication establishment at a destination user node.

The decryption method is depicted in FIG. 12 at the destination side, $U_d$. Initially, $U_d$ receives a communication request from the CA, 108. Then the $U_d$ DAK daemon forks a child communication process $U_d\_COM$ in order to freeze the generation of its version of DAK and sends the DAK_NRC to the CA for synchronization purposes, 110. $U_d\_COM$ will run on behalf of the user until the end of the users' session communication. In the event of successful handshaking with the CA, 112 (see also FIG. 14), the destination user receives an initial dynamic session key DSK, from the CA, 114.

After successful handshaking, $U_d$ uses the initial DSK to randomly generate n DSKs ($DSK^t_i$, $1 \le i \le n$) of the same size as the initial DSK (used as a seed), 116. Beginning with the same initial DSK at both $U_s$ and $U_d$ nodes, $U_d$ randomly derives the same set of n regenerated DSKs as the source user $U_s$, and parallels the encryption method described at the source user side in reverse, to decrypt the transmitted data. $U_d$ receives a block of n cipher records ($Cipher_i$; $1 \le i \le n$) 118. All cipher records are decrypted using each record's corresponding Hash_DSK_Vec, 120. Concatenation of the decrypted records provides the original message data to the destination user, 122. $U_d$ then regenerates new DSKs and Hash_DSK_Vecs from the recovered block of data records and the current DSKs and Hash_DSK_Vecs to be used for decryption of the next block of cipher records, 124, as illustrated in FIGS. 15a and 15b. The process is repeated, 126, until all the transmitted cipher data has been decrypted.

Figure 13:
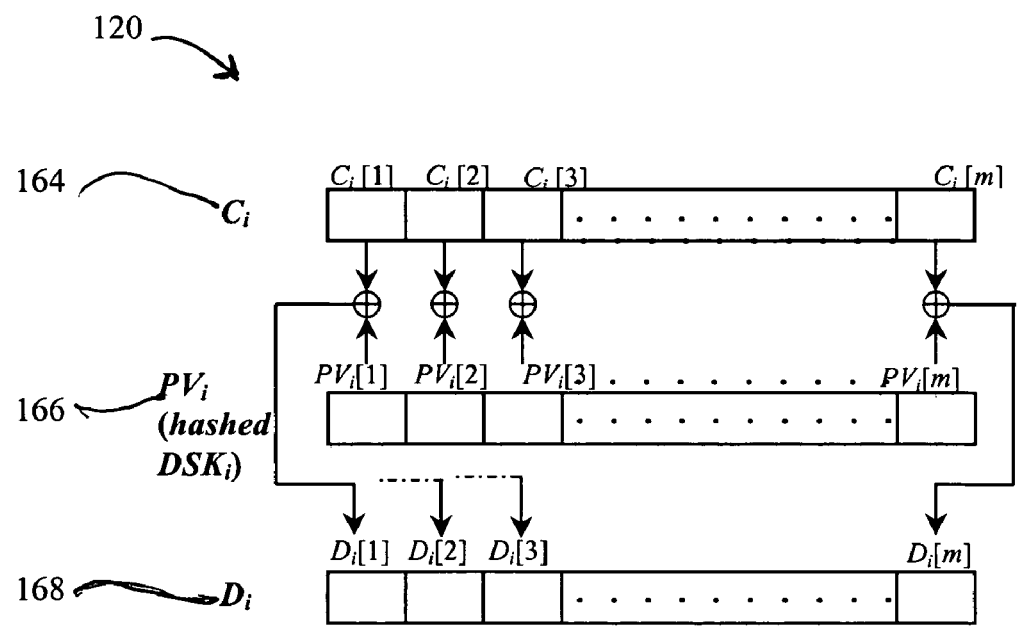
FIG. 13 is a diagrammatic illustration of a dynamic decryption utilizing a permutation vector.

Referring to FIG. 13, a diagram illustrates the decryption method at 120 of FIG. 12 in greater detail. The decryption method starts by performing the XOR operation on $C_i[j]$, 164 and the corresponding $PV_i[j]$, for $1 \le j \le m$, 166. This results in the original data record $D_i$, for $1 \le i \le n$, 168. The process continues as shown in FIG. 12, at 122.

It will be understood by those of skill in the art one or more alternative logic operations can be substituted for the XOR logic operation depicted in FIGS. 11 and 13 in accordance with the principles of the method and system for information security.

Figure 14:
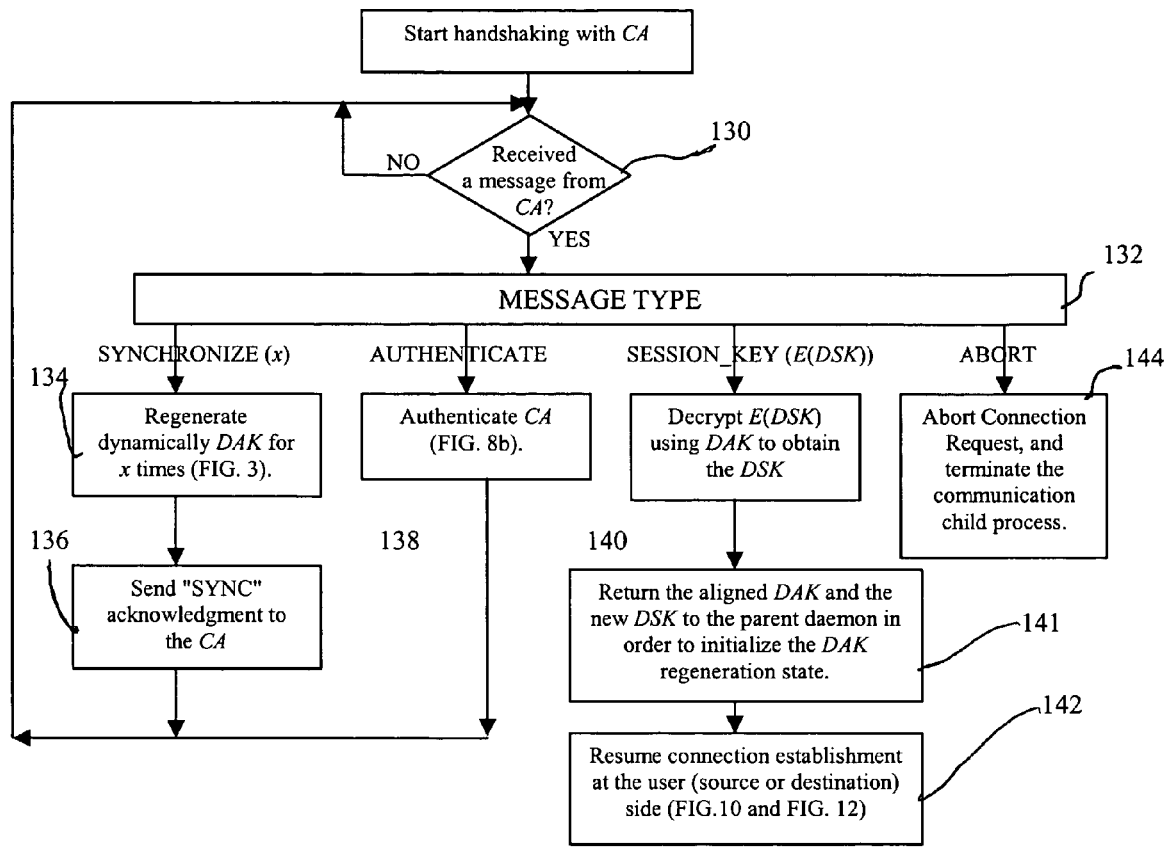
FIG. 14 is a diagrammatic illustration of a user handshaking method with a CA.

As discussed in FIGS. 10 and 12, upon request for a secure communication, both the source user and destination user must accomplish a successful handshaking process with the CA. FIG. 14 illustrates a user handshaking method with the CA. Upon receiving a message from the CA, 130, the user responds accordingly, 132. If an "abort" message is received, then the user terminates the communication child process in charge of the connection, 144. If authentication is requested, 138, the user mutually authenticates with the CA as described in FIGS. 8a and 8b. If a "synchronize" message is received including a number (x), the user performs x regenerations of its DAK, in order to be synchronized with the CA, i.e., aligning to the same DAK 134, as described in FIG. 7. An acknowledgment message is then sent back to the CA, 136.

After either synchronization or authentication, the user waits for a "session key" message including an encrypted DSK, (E(DSK)). The encrypted DSK is decrypted, 140. Then, the communication child process returns the aligned DAK and the new DSK to its parent daemon in order to initialize a new state for the DAK regeneration state, 141, and the communication between the source and destination is securely established, 142. The process continues at 96 of FIG. 10 and 116 of FIG. 12.

Figure 15A:
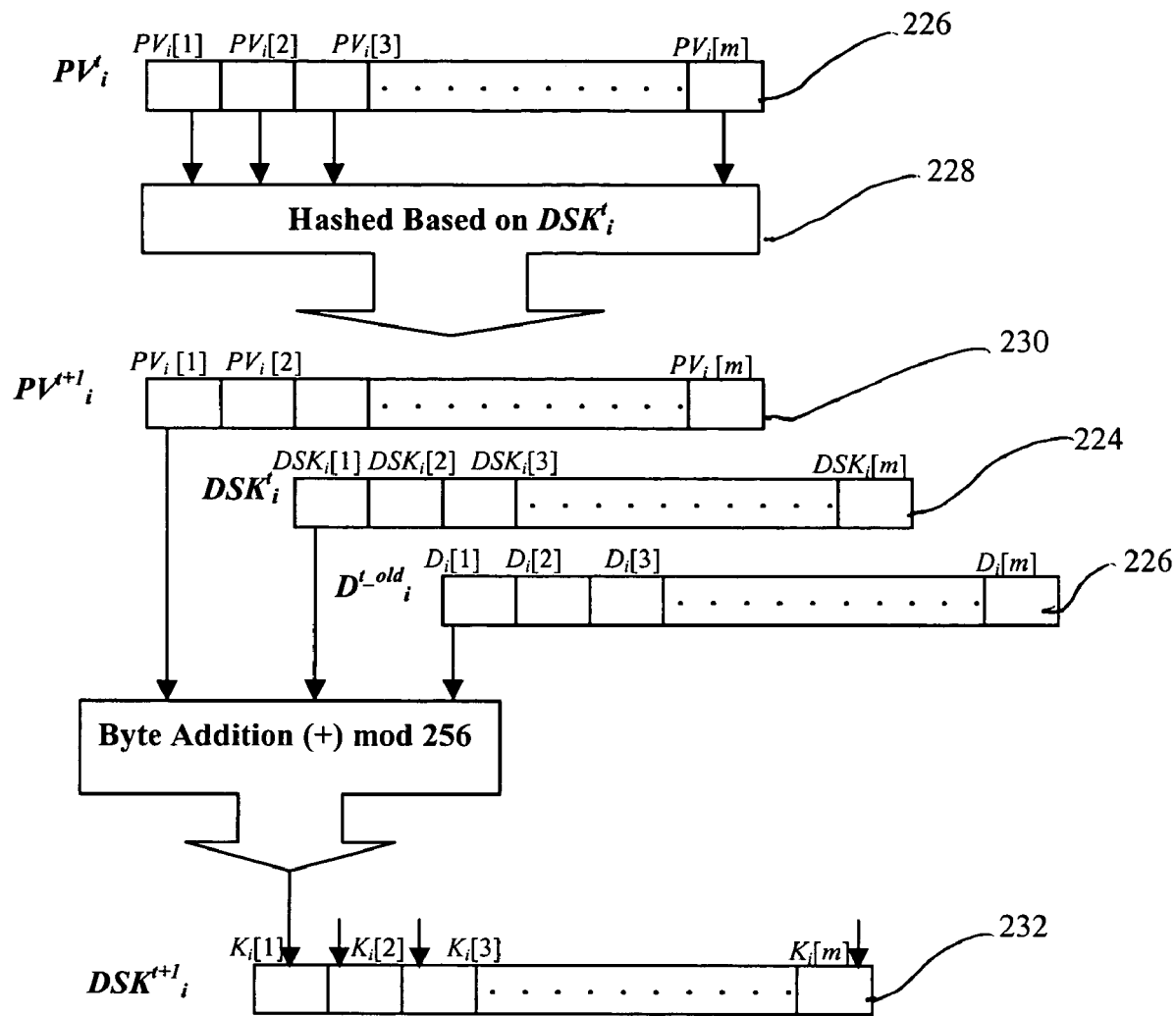
FIG. 15a is a diagrammatic illustration of a DSK regeneration method.
Figure 15B:
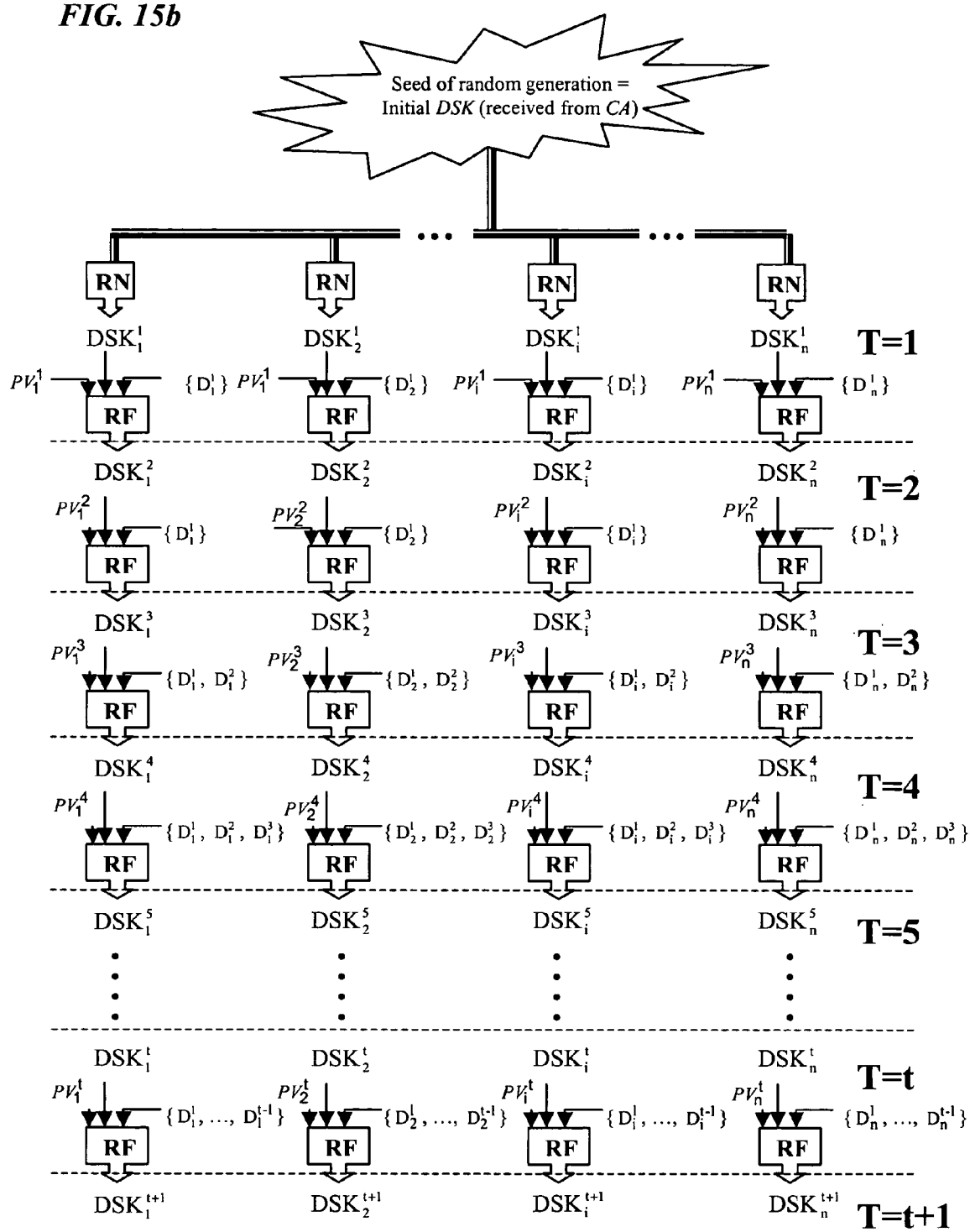
FIG. 15b is a diagrammatic illustration of the DSK regeneration method of FIG. 15a demonstrating utilization of previously encrypted data records from different time interval blocks in the regeneration process.

Attention is now turned to FIGS. 15a and 15b, where regeneration of n DSKs and n Hash_DSK_Vecs, or n PVs, is shown. FIG. 15a is a diagram illustrating the dynamic session key (DSK) regeneration method of FIG. 10, 102, and FIG. 12, 124. FIG. 15b is a diagram illustrating n "tracks" or streams of parallel DSK regeneration for a plurality of data record blocks. Each block of data records includes those data records encrypted within a predefined time increment (T). FIG. 15b illustrates blocks of data records from the range of time increments of T=1 through T=t+1. A "track" is defined as those data records in alignment within their respective data blocks, hence a track consists of a vertical column of data records as depicted in FIG. 15b.

In FIG. 15a $DSK^t_i[j]$ 224 represents the $j^{th}$ byte of the last $i^{th}$ dynamic session key at time t, $D^{t\_old}_i[j]$ 226 represents the $j^{th}$ byte of the last $i^{th}$ data record at time "t_old", where "t_old" represents a time prior to time t, for $1 \le i \le n$ and $1 \le j \le m$. First, $PV^t_i$ 226 is hashed 228 using $DSK^t_i$ generating Hash_DSK_Vec, namely $PV_i^{t+1}$. In the hashing process, the $DSK^t_i$ bytes are scanned from index 1 to index m, using each entry's index and its associated entry value, as indices of two bytes in the permutation vector to be swapped. The permutation is performed as follows:

permute $PV^t_i[j]$ with $PV^t_i[DSK^t_i[j]]$, for $1 \le j \le m$, which results in a "new" permutation vector $PV^{t+1}_i$, 230. Then, a data record $D^{t\_old}_i$ 226 is selected randomly from the previously encrypted data records $\{D_i^1, D_i^2, \ldots D_i^{t-1}\}$ in the $i^{th}$ track. (See also FIG. 15b.) This is accomplished by randomly selecting the index t_old from the range of [1, t−1] using a predetermined byte of the current key $DSK_i^t[j]$ as the seed of random generation. For example, the first byte of the current key, $DSK_i^t[1]$, may be used as the seed of random generation. However, when generating $DSK_i^2$, the only available data record is $D_i^1$, therefore, t_old=1. Once the index t_old is selected from the range [1, t−1], the corresponding previously encrypted data record $D_i^{t-old}$ 226 and the permutation vector $PV_i^{t+1}$ 230 are added with the $DSK_i$ 224 in order to get the new $DSK_i^{t+1}$ 232, where $DSK_i^{t+1}[j]=(DSK_i^t[j]+D_i^{t-old}[j]+PV_i^{t+1}[j])$ mod 256.

Referring to FIG. 15b, where "RN" represents a random selection function and "RF" represents dynamic key regeneration as depicted in FIG. 15a, the initial DSK is first received from the CA in order to start a secure source-destination communication with n tracks of parallel encryption, each track having its own stream of DSKs. The initial DSK received from the CA is used to randomly generate the initial n DSKs, one for each of the n tracks of data records, $(D_1^1, D_2^1, \ldots, D_n^1)$, where $D_i^t$ represents the data record of the $i^{th}$ track at time t. Let $PV_i^t$ and $DSK_i^t$ represent the PV and DSK of the $i^{th}$ track at time t, respectively. (See also FIG. 10, 96 and FIG. 12, 116.) At time t+1, the $DSK_i^{t+1}$ is regenerated based on $DSK_i^t$, $PV_i^t$, and a randomly selected data record from the previously encrypted data record set $\{D_i^1, D_i^2, \ldots, D_i^{t-1}\}$ in the $i^{th}$ track. The data record is randomly selected by randomly selecting the index t_old from the range of [1, t−1] using a predetermined byte of the current key $DSK_i^t[j]$ as the seed of random generation.

A randomly selected encrypted data record from the data record set $\{D_i^1, D_i^2, \ldots, D_i^{t-1}\}$ is used in the regeneration of $DSK_i^{t+1}$ to render the latter obsolete in the event that a DSK is compromised by unauthorized intrusion. In the unlikely event that $DSK_i^{t+1}$, in the $i^{th}$ track, is obtained by an intruder, then the intruder can only obtain the data record $D_i^{t+1}$ because the intruder has the cipher $C_i^{t+1}$. However, the intruder cannot obtain more than that. The intruder must obtain the entire set of previously encrypted data records $\{D_i^1, D_i^2, \ldots, D_i^t\}$ in order to generate $DSK_i^{t+2}$, or any successor DSK. Hence, breaking one DSK will aid only in decrypting its corresponding data record and nothing more, past or future ciphered data.

Figure 16:
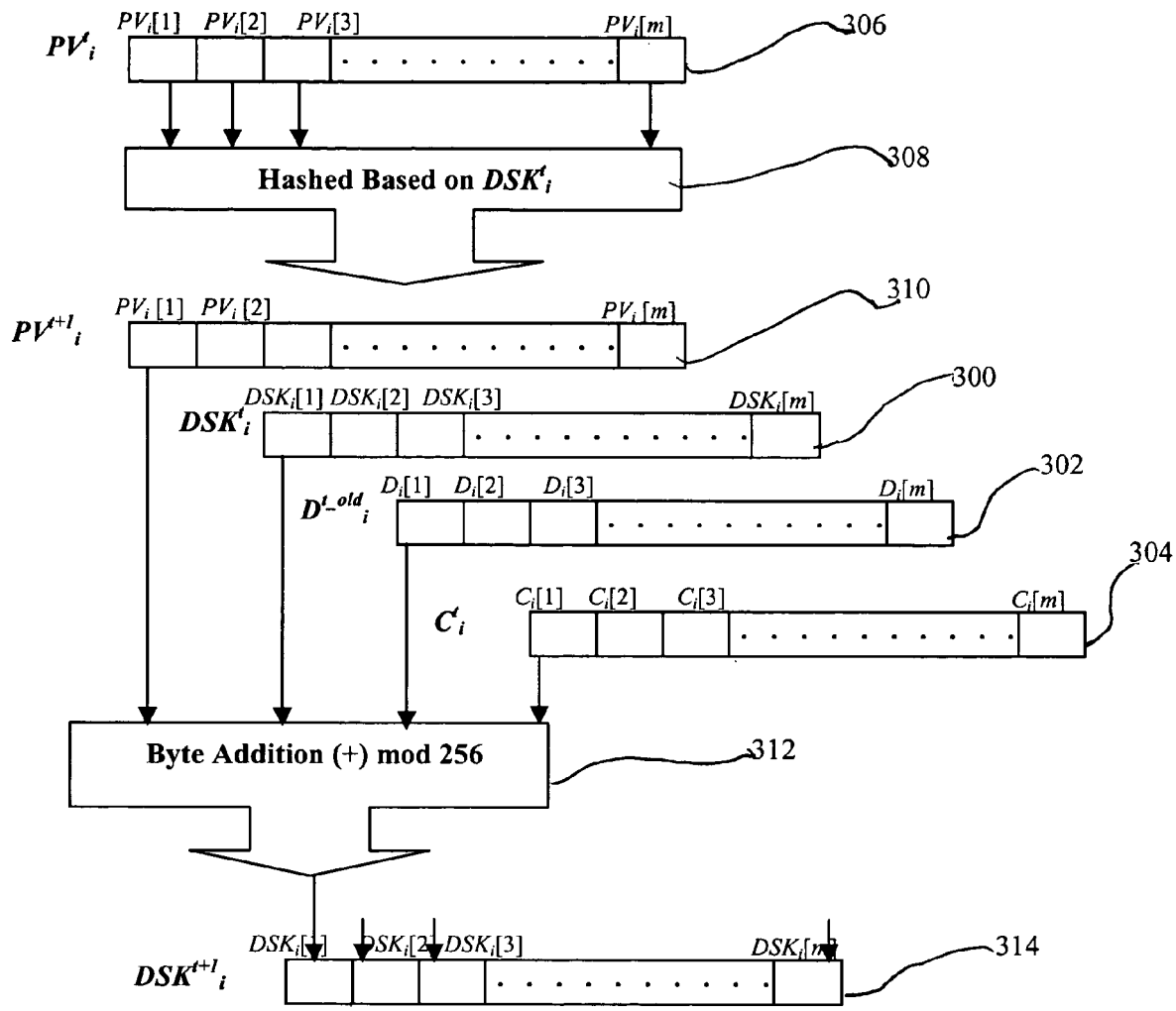
FIG. 16 is a diagrammatic illustration of DSK regeneration utilizing a permutation vector, a previous DSK, data record, and cipher data record.

The DSK regeneration depicted in FIG. 15a is modified as shown in FIG. 16 to further protect against data integrity violation and cipher injection attacks. In FIG. 16, $DSK_i^t[j]$ 300 represents the $j^{th}$ byte of the last $i^{th}$ dynamic session key at time t, $D^{t-old}_i[j]$ 302 represents the $j^{th}$ byte of the last $i^{th}$ data record at time "t_old", $C_i^t[j]$ 304 represents the $j^{th}$ byte of the last $i^{th}$ cipher record at time t, $1 \leq i \leq n$ and $1 \leq j \leq m$. First, $PV_i^t$ 306 is hashed using $DSK_i^t$ 308 generating Hash_DSK_Vec, namely $PV_i^{t+1}$. In the hashing process, the $DSK_i^t$ bytes are scanned from index 1 to index m, using each entry's index and its associated entry value, as indices of two bytes in the permutation vector to be swapped. The permutation is performed as follows: permute $PV_i^t[j]$ with $PV_i^t[DSK_i^t[j]]$, for $1 \leq j \leq m$, which results in a "new" permutation vector $PV_i^{t+1}$. Then, a data record $D^{t-old}_i$ is selected randomly from the previously encrypted data records $\{D_i^1, D_i^2, \ldots, D_i^{t-1}\}$ in the $i^{th}$ track. This is accomplished by randomly selecting the index t_old from the range of [1, t−1] using a predetermined byte of the current key $DSK_i^t[j]$ as the seed of random generation. Then, the corresponding previously encrypted data record $D^{t-old}_i$ 302, the received cipher record $C_i$ 304, and the permutation vector $PV_i$ 310 are added with the $DSK_i$ 300 to produce the new $DSK_i^{t+1}$ 314, where $DSK_i^{t+1}[j]=(DSK_i^t[j]+D^{t-old}_i[j]+PV_i^{t+1}[j]+C_i^t[j])$ mod 256 312.

Figure 17A:
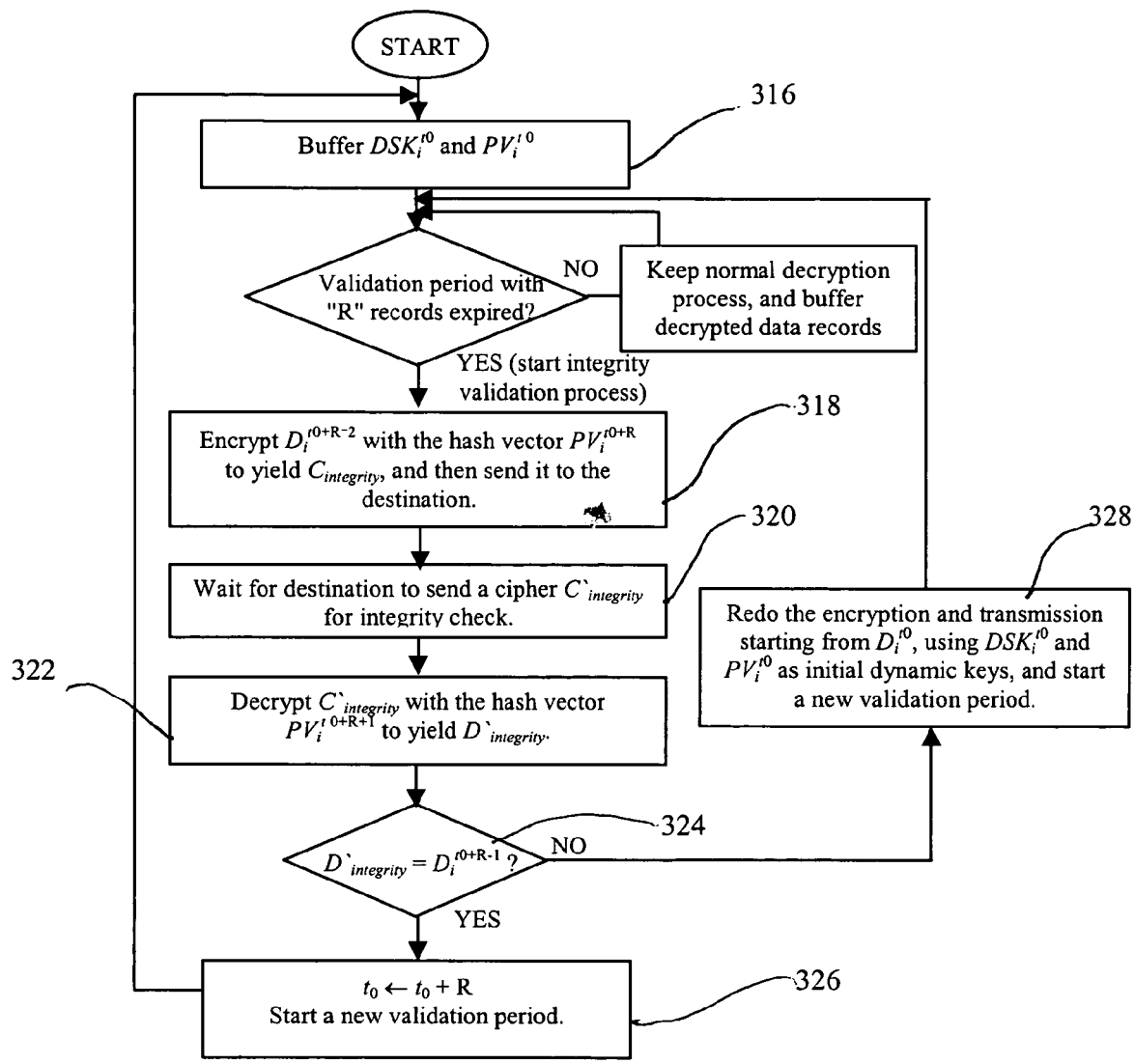
FIG. 17a is a diagrammatic illustration of a method to validate data integrity of R data records at a source node.

Referring to FIG. 17a, a diagram illustrates a method to validate data integrity of R data records at a source node. At the beginning of each predefined validation period, the $DSK_i^{t0}$ and $PV_i^{t0}$, where $t_0$ is initialized first with zero, are buffered 316. At this point, all previously sent data records are considered to be valid at the destination node; the source and the destination have the same set of data records, and no intruder violated data integrity or injected extra cipher. After encrypting and sending R records $(D_i^{t0}, D_i^{t0+1}, \ldots, D_i^{t0+R-1})$, the source encrypts again the data record $D_i^{t0+R-2}$ using $PV_i^{t0+R}$ yielding a cipher $C_{integrity}$, and sends it to the destination 318. Then the source waits to receive a cipher $C'_{integrity}$ from the destination, in order to verify that all dynamic keys, at the source and the destination nodes, are synchronized 320. When $C'_{integrity}$ is received, the source decrypts it using $PV_i^{t0+R+1}$ 322 and verifies that the resulting plaintext $D'_{integrity}$ is identical to the last sent data record $D_i^{t0+R-1}$ 324. In case of equality, all the previous R records are considered safely sent. Then, $t_0$ is incremented by R 326, and new $DSK_i^{t0}$ and $PV_i^{t0}$ are buffered in order to start the next validation session. In case of any violation, the source encrypts and retransmits the set $(D^{t0}_i, D^{t0+1}_i, \ldots, D^{t0+R-1}_i)$ again to the destination 328.

Figure 17B:
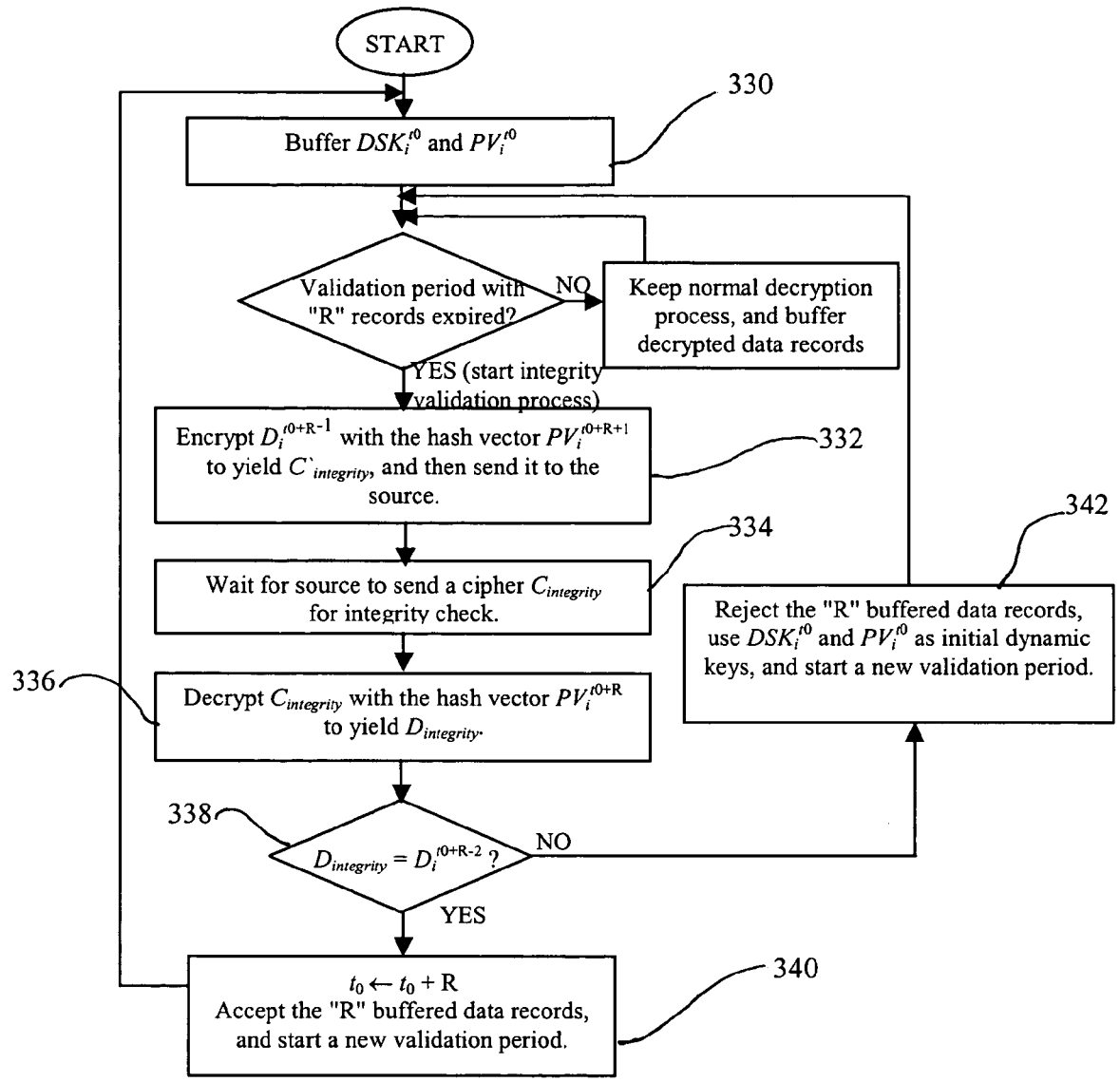
FIG. 17b is a diagrammatic illustration of a method to validate data integrity of R data records at a destination node.

Referring to FIG. 17b, a diagram illustrates a method to validate data integrity of R data records at a destination node. At the beginning of each predefined validation period, $DSK_i^{t0}$ and $PV_i^{t0}$, where $t_0$ is initialized first with zero, are buffered 330. At this point, all the previously received data records are considered to be valid at the destination node; the source and the destination have the same set of data records, and no intruder violated data integrity or injected extra cipher. After buffering R decrypted records $(D_i^{t0}, D_i^{t0+1}, \ldots, D_i^{t0+R-1})$, the destination encrypts the data record $D_i^{t0+R-1}$ using $PV_i^{t0+R+1}$ yielding a cipher $C'_{integrity}$, and sends it back to the source 332. Then the destination waits to receive a cipher $C_{integrity}$ from the source, in order to verify that all dynamic keys, at the source and the destination nodes, are synchronized 334. When $C_{integrity}$ is received, the destination decrypts it using $PV_i^{t0+R}$ 336 and verifies that the resulting plaintext $D_{integrity}$ is identical to the previously decrypted data record $D_i^{t+R-2}$ 338. In case of equality, all the previously buffered R records are considered valid. Then, $t_0$ is incremented by R 340, and new $DSK_i^{t0}$ and $PV_i^{t0}$ are buffered in order to start the next validation session. In case of any violation, the destination rejects the last "R" buffered data records, and starts a new validation period, using $DSK_i^{t0}$ and $PV_i^{t0}$ as initial dynamic keys 342. The validation session length (R), discussed with reference to FIG. 17a and FIG. 17b, can be fixed or variable depending on the implementation.

Although the method and system for information security has been described in detail with reference to particular embodiments, other embodiments can achieve the same results. Variations and modifications of the method and system for information security will be obvious to those skilled in the art and it is intended to cover in the appended claims all such modifications and equivalents.

What is claimed is:

1. A method of generating an encryption key, the method comprising the steps of:

hashing a hash vector based upon an encryption key by scanning indexed bytes of the encryption key and using indices and associated values of indices of the encryption key as indices of two bytes in a hash vector to be swapped; and regenerating a new encryption key with the encryption key, encrypted data, and the hash vector based upon the encryption key.

2. The method of claim 1 wherein the step of regenerating a new encryption key with an encryption key, encrypted data, and a hash vector based upon an encryption key comprises performing byte addition of the encryption key, encrypted data, and the hash vector based upon the encryption key.

3. The method of claim 1 wherein the step of regenerating a new encryption key with an encryption key, encrypted data, and a hash vector based upon the encryption key comprises: selecting a previously encrypted data record; and regenerating a new encryption key with the encryption key, selected encrypted data, and the hash vector based upon the encryption key.

4. The method of claim 3 wherein the step of selecting a previously encrypted data record comprises: randomly selecting an index from a predetermined range using a byte of the encryption key as a seed of random generation; and selecting the previously encrypted data record corresponding to the selected index.

5. The method of claim 1 wherein the step of regenerating a new encryption key with an encryption key, encrypted data, and a hash vector based upon the encryption key comprises regenerating a new encryption key with the encryption key, previously encrypted data, a the hash vector based upon the encryption key, and a received cipher record.

6. A method of generating an encryption key, the method comprising the steps of:
    generating n encryption keys;
    encrypting n tracks of data records with n tracks of parallel encryption operation;
    hashing a hash vector based upon the encryption key by scanning indexed bytes of the encryption key and using indices and associated values of indices of the encryption key as indices of two bytes in a hash vector to be swapped; and
    regenerating an encryption key with the encryption key, the hash vector based upon the encryption key, and selected encrypted data.

7. The method of claim 6 wherein the step of regenerating an encryption key with the encryption key, a hash vector based upon the encryption key, and selected encrypted data comprises: randomly selecting an index from a predetermined range using a byte of the encryption key as a seed of random generation; and selecting the previously encrypted data record corresponding to the selected index.

8. A method of generating an encryption key, the method comprising the steps of:
    hashing a hash vector based upon an encryption key by scanning indexed bytes of the encryption key and using indices and associated values of indices of the encryption key as indices of two bytes in a hash vector to be swapped;
    encrypting a data record with the hash vector based upon the encryption key; and
    regenerating the encryption key with the encryption key and encrypted data.

9. The method of claim 8 wherein the step of encrypting a data record with a hash vector based upon an encryption key comprises performing a logic operation on a data record and the hash vector based upon the encryption key.

10. The method of claim 9 wherein the step of performing a logic operation on a data record and a hash vector based upon an encryption key comprises performing an XOR operation on a data record and a hash vector based upon the encryption key.

11. The method of claim 8 further comprising the step of decrypting encrypted data, comprising performing a logic operation on an encrypted data record and the hash vector based upon the encryption key.

12. The method of claim 11 wherein the step of performing a logic operation on an encrypted data record and a hash vector based upon an encryption key comprises performing an XOR operation on an encrypted data record and the hash vector based upon the encryption key.

13. A system for generating an encryption key, the system comprising:
    a source node;
    a destination node;
    a data stream created at said source node;
    means for encrypting data of said data stream with a hash vector based upon an encryption key;
    means for hashing the hash vector based upon the encryption key by scanning indexed bytes of the encryption key and using indices and associated values of indices of the encryption key as indices of two bytes in a hash vector to be swapped; and
    means for regenerating a new encryption key with the encryption key, encrypted data, and the hash vector based upon the encryption key.

* * * * *